US009063324B2

(12) United States Patent
Okawa

(10) Patent No.: US 9,063,324 B2
(45) Date of Patent: Jun. 23, 2015

(54) OPTICAL INSTRUMENT

(71) Applicant: Olympus Imaging Corp., Shibuya-ku, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/306,409

(22) Filed: Jun. 17, 2014

(65) Prior Publication Data

US 2014/0293439 A1  Oct. 2, 2014

Related U.S. Application Data

(63) Continuation of application No. PCT/JP2012/082195, filed on Dec. 12, 2012.

(30) Foreign Application Priority Data

Dec. 28, 2011 (JP) .................... 2011-287687

(51) Int. Cl.
G02B 15/14 (2006.01)
G02B 15/16 (2006.01)
G03B 3/10 (2006.01)
G03B 5/00 (2006.01)
G02B 7/10 (2006.01)
G02B 7/28 (2006.01)

(52) U.S. Cl.
CPC *G02B 15/16* (2013.01); *G03B 3/10* (2013.01); *G03B 5/00* (2013.01); *G03B 2205/0046* (2013.01); *G03B 2205/0053* (2013.01); *G02B 7/102* (2013.01); *G02B 7/282* (2013.01)

(58) Field of Classification Search
USPC .................. 359/694–701, 811–830
See application file for complete search history.

(56) References Cited

U.S. PATENT DOCUMENTS 5,477,298 A   12/1995   Shiina
5,850,577 A   12/1998   Ito
5,854,711 A * 12/1998   Kaneda .................. 359/697
(Continued)

FOREIGN PATENT DOCUMENTS

JP   H09-269448   10/1997
JP   2003-279836  10/2003
(Continued)

OTHER PUBLICATIONS

International Search Report (PCT/ISA-120) to corresponding PCT Application No. PCT/JP2012/082195 (with translation).

*Primary Examiner* — Mohammed Hasan
(74) *Attorney, Agent, or Firm* — John C. Pokotylo; Straub & Pokotylo

(57) ABSTRACT

An optical instrument of the present invention has a first lens group and a second lens group capable of moving in an optical axis direction in order to perform optical zooming, and comprises a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region, and establishes a second optical state of a higher shooting magnification than a first optical state, when establishing substantially the same focal length as a focal length of the first optical state based on the first position information.

12 Claims, 34 Drawing Sheets

(56) References Cited

U.S. PATENT DOCUMENTS 6,178,051 B1 * 1/2001 Tanaka .......................... 359/698
2009/0168199 A1 * 7/2009 Ishikawa et al. ............. 359/696

FOREIGN PATENT DOCUMENTS

| | | |
|---|---|---|
| JP | 2007-293144 | 11/2007 |
| JP | 2010-204613 | 9/2010 |

* cited by examiner

A POINT 177aA

177a

177aOUT

B POINT 177aB

FIG. 8A
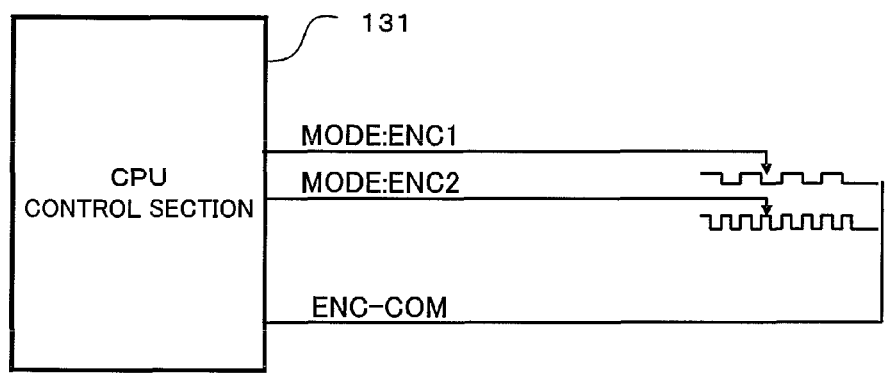
FIG. 8B
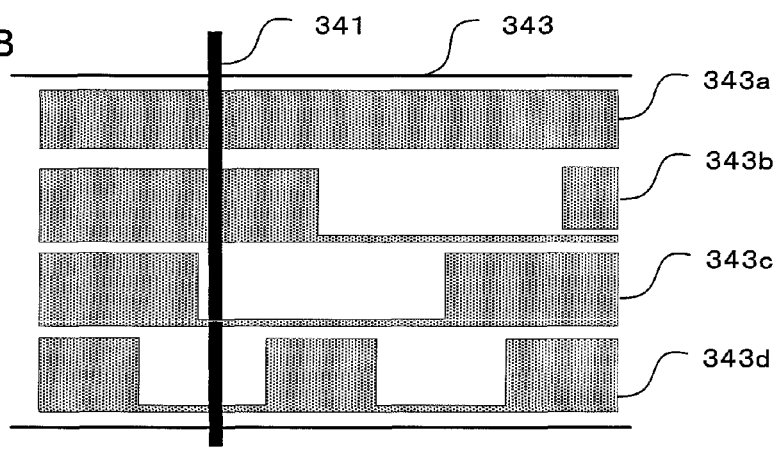
FIG. 8C
| NAME | I/O | FUNCTION |
|---|---|---|
| MODE-ENC1 | I | L:CONTACT H:NON-CONTACT |
| MODE-ENC0 | I | L:CONTACT H:NON-CONTACT |
| ENC-COM | O | L:ACTIVE, COMMON |
FIG. 8D
| | MODE | | |
|---|---|---|---|
| STATE | MACRO | EZ | MZ |
| MODE-ENC1 | 1 | 1 | 0 |
| MODE-ENC0 | 0 | 1 | 1 |
| ENC-COM | 0 | 0 | 0 |

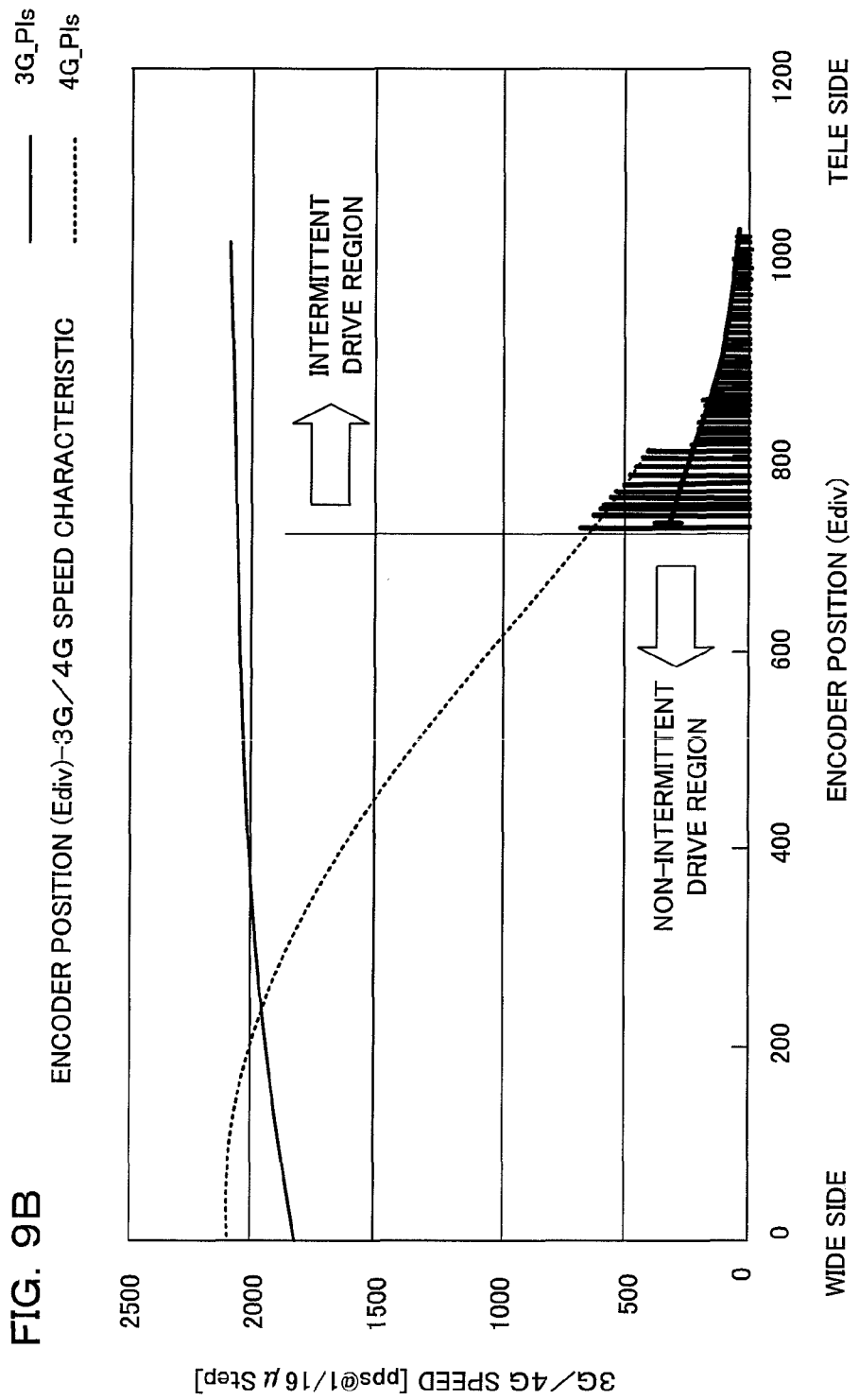

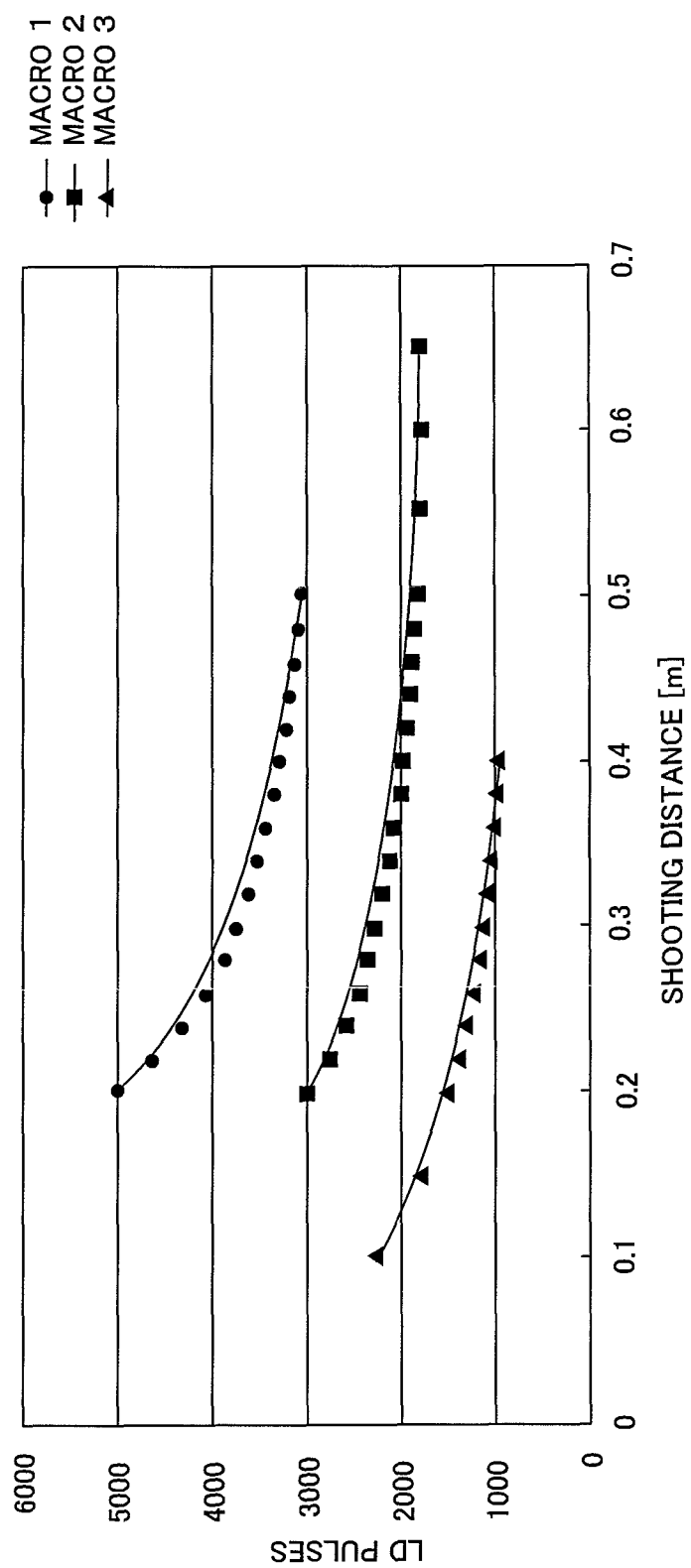

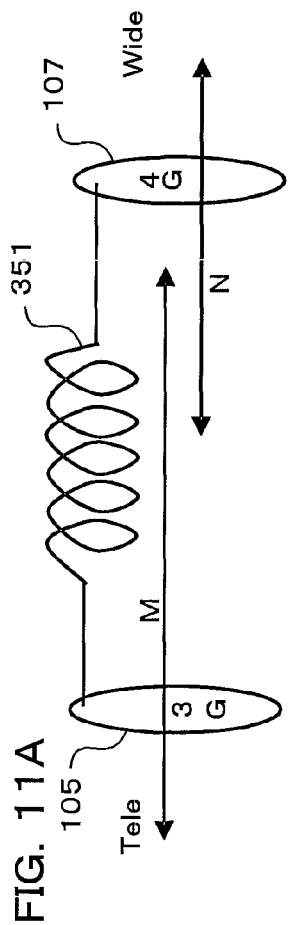
FIG. 11A
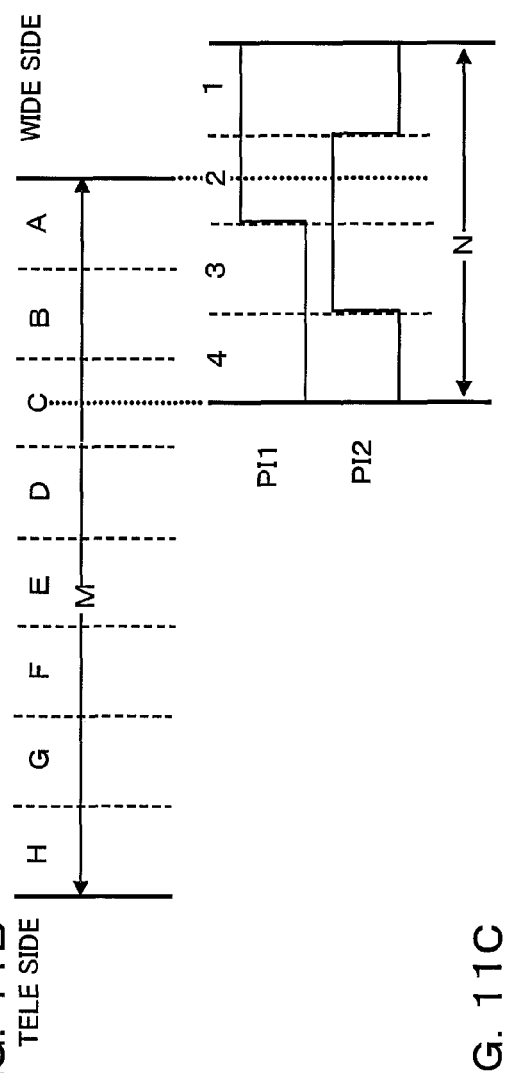
FIG. 11B
FIG. 11C
| BORDER | A-B | B-C | C-D | D-E | E-F | F-G | G-H |
|---|---|---|---|---|---|---|---|
| AREA⇒Ediv CONVERSION | 132 | 400 | 592 | 670 | 751 | 830 | 909 |
| BORDER | 1-2 | 2-3 | 3-4 |
|---|---|---|---|
| AREA⇒Ediv CONVERSION | 7 | 184 | 593 |

FIG. 16B

| MODE TRANSITION | ←SUBJECT SIDE ...... BODY SIDE→ | | | LENS OPERATION AT TIME OF MODE TRANSITION | | FOCUS POSITION FOR EACH MACRO | | |
|---|---|---|---|---|---|---|---|---|
| | Macro | EZ | MZ | ZOOM LENS POSITION | FOCUS LENS POSITION | Macro1 | Macro2 | Macro3 |
| Macro→EZ | | ↑ | | SAME ANGLE OF VIEW POSITION AS FOR MACRO | POSITION OF MAXIMUM FOCUS DISTANCE FOR MACRO ⇒ | 50 | 65 | 40 |
| EZ→Macro | ↓ | | | MACRO POSITION | POSITION OF MAXIMUM FOCUS DISTANCE FOR MACRO ⇒ | 50 | 65 | 40 |
| EZ→MZ | | | ↑ | MZ DETECTION POSITION | EZ FOCUS POSITION + TRACKING | – | – | – |
| MZ→EZ | | | ↓ | SAME ANGLE OF VIEW POSITION AS FOR MZ (DRIVE NOT REQUIRED) | MZ FOCUS POSITION + TRACKING | – | – | – |
| Macro→MZ | | ↑ | ↑ | SAME AS PROCESSING FOR MACRO→EZ→MZ | SAME AS PROCESSING FOR MACRO→EZ→MZ | – | – | – |
| MZ→Macro | ↓ | ↓ | | SAME AS PROCESSING FOR MACRO→EZ→MZ | POSITION OF MAXIMUM FOCUS DISTANCE FOR MACRO ⇒ | 50 | 65 | 40 |

FIG. 17A  ZOOM POSITION AT TIME OF MACRO

| 3G POSITION (Ediv) | 890 |
|---|---|
| 4G POSITION (Ediv) | 668 |

|  | Macro POSITION | | |
|---|---|---|---|
|  | Macro1 | Macro2 | Macro3 |
| 3G POSITION (Ediv) | 890 | 761 | 428 |
| 4G POSITION (Ediv) | 668 | 543 | 134 |

FIG. 17B  ZOOM POSITION AT TIME OF MACRO COMPLETION (MACRO ANGLE OF VIEW POSITION)

| POSITION (Ediv) | 908 |
|---|---|

|  | Macro POSITION | | |
|---|---|---|---|
|  | Macro1 | Macro2 | Macro3 |
| POSITION (Ediv) | 908 | 763 | 398 |

FIG. 17C  LD POSITION AT TIME OF MACRO

| LD POSITION (pls) | 4106 |
|---|---|

|  | Macro POSITION | | |
|---|---|---|---|
|  | Macro1 | Macro2 | Macro3 |
| LD POSITION (pls) | 4106 | 3124 | 2875 |

FIG. 19

| ZM POSITION | Ediv | ZMENC VALUE RETURNED TO BODY | CENTRAL FOCAL LENGTH |
|---|---|---|---|
| MZ_Wide | 0 | 0 | 12 |
| | 1 | 0 | 12 |
| | 2 | 0 | 12 |
| | 3 | 0 | 12 |
| | ... | ... | ... |
| | 30 | 0 | 12 |
| | 31 | 0 | 12 |
| EZWide END | 32 | 0 | 12 |
| | 33 | 0 | 12 |
| | 34 | 0 | 12 |
| | 35 | 0 | 12 |
| | 36 | 1 | 13 |
| | 37 | 1 | 13 |
| | 38 | 1 | 13 |
| | 39 | 1 | 13 |
| | 40 | 1 | 13 |
| | ... | ... | ... |
| | 987 | 121 | 48 |
| | 988 | 121 | 50 |
| | 989 | 121 | 50 |
| | 990 | 122 | 50 |
| | 991 | 122 | 50 |
| | 992 | 122 | 50 |
| | 993 | 122 | 50 |
| EZTele END | 994 | 123 | 50 |
| | 995 | 123 | 50 |
| | 996 | 123 | 50 |
| | ... | ... | ... |
| | 1017 | 124 | 50 |
| | 1018 | 124 | 50 |
| | 1019 | 124 | 50 |
| MZ_Tele | 1020 | 124 | 50 |
| Macro1 | 1021 | 125 | 42 |
| Macro2 | 1022 | 126 | 28 |
| Macro3 | 1023 | 127 | 10 |

UNITS: mm

FIG. 20

| ZOOM MODE AT TIME OF COMPLETION (LENS STOP 2) | | | ZOOM MODE AT TIME OF START-UP (SetInitAct) | | | | | |
|---|---|---|---|---|---|---|---|---|
| ZOOM MODE | RESET DRIVE INSTRUCTION | | LENS→BODY ZMENC VALUE | EZ | | MZ | | MACRO POSITION |
| | PRESENT | NOT PRESENT | | PARAMETER DESIGNATION | ARBITRARY INITIALIZATION | PARAMETER DESIGNATION | ARBITRARY INITIALIZATION | ARBITRARY INITIALIZATION |
| EZ | EZ OPTIMUM POSITION FOR RESET (Wide) | EZ OPTIMUM POSITION FOR RESET | ZMENC VALUE AT TIME OF LENS STOP 2 INSTRUCTION (EZ FINAL POSITION OR WIDE POSITION) | SetInitActLens INSTRUCTION ZMENC VALUE (EZ FINAL POSITION) | WIDE END | NO DRIVE | NO DRIVE | MACRO POSITION |
| MZ | NO DRIVE | ↓ | ZMENC VALUE AT TIME OF LENS STOP 2 INSTRUCTION (MZ FINAL POSITION) | SetInitActLens INSTRUCTION ZMENC VALUE (MZ FINAL POSITION) | WIDE END | NO DRIVE | NO DRIVE | MACRO POSITION |
| Macro | OPTIMUM MACRO POSITION FOR RESET | ↓ | ZMENC VALUE AT TIME OF LENS STOP 2 INSTRUCTION (32:ZMENC PARTITION FINAL VALUE) | SetInitActLens INSTRUCTION ZMENC VALUE (SAME ANGLE OF VIEW POSITION AS Macro) | WIDE END | NO DRIVE | NO DRIVE | MACRO POSITION |

125~127 ARE ENCODER FOR MACRO POSITION

OPTICAL INSTRUMENT

CROSS-REFERENCE TO RELATED APPLICATIONS

This application is a Continuation Application of PCT Application No. PCT/JP2012/082195, filed on Dec. 12, 2012, and based upon and claiming the benefit of priority from prior Japanese Patent Application No. 2011-287687, filed on Dec. 28, 2011, the entire contents of all of which are incorporated herein by reference.

BACKGROUND OF THE INVENTION

1. Field of the Invention

The present invention relates to an optical instrument having a zoom function for varying focal length of an imaging optical system, and being capable of moving a plurality of zoom lens groups independently, and an imaging device.

2. Description of the Related Art

A zoom lens having a first cam region of a zoom region for causing movement of a zoom lens group, and a second cam region, extending from an end part of the first cam region, for causing movement of a lens group to a macro position where macro shooting is possible, formed in a lens barrel as a continuous cam, is known (refer to Japanese patent laid open number 2003-279836 (hereafter referred to as patent publication 1)).

Also, in order to achieve size reduction of a lens barrel, it has been proposed, instead of a mechanical cam, to drive a front group and rear group of lenses by respective independent motors. For example, Japanese patent laid-open No. Hei. 6-324245 (hereafter referred to as patent publication 2) discloses, in a zoom lens having a front lens group and a rear lens group, a zoom lens unit having a front lens group drive motor and a rear lens group drive motor, and carrying out a zoom operation by driving both motors together when a power supply voltage is greater than or equal to a specified value.

SUMMARY OF THE INVENTION

However, with the zoom lens unit disclosed in patent publication 1, a cam mechanism for moving lenses to a macro position is constructed inside the zoom lens unit, increasing the size. Also, the cam for moving the lenses to the macro mode generates sliding noise, which impairs usability. Also, there is no disclosure in patent publication 2 of optical application to a macro state.

The present invention has been conceived in view of the above-described situation, and an object thereof is to provide an optical instrument configured to carry out a zoom operation by driving a plurality of zoom lens groups using respectively individual actuators, capable of being reduced in size and also capable of taking pictures outside a normal zoom range, such as macro photography etc., and to an imaging device.

An optical instrument of the present invention has first and second lens groups capable of moving in an optical axis direction in order to perform optical zooming, and comprises a first drive section for moving the first lens group using a first actuator, a second drive section for moving the second lens group using a second actuator that is different from the first actuator of the first drive section, a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region with a second optical state of a higher shooting magnification than a first optical state being established when establishing substantially the same focal length as a focal length of the first optical state based on the first position information, and a control section for controlling the first drive section and the second drive section so that, when setting up an optical state of a higher shooting magnification from an optical state where positions of the first lens group and the second lens group have been positioned at positions corresponding to the same focal length that falls within a focal length region range in which zoom operations are carried out, based on the first position information, the first lens group and the second lens group are respectively moved to positions corresponding to focal lengths that are mutually different to those of the first position information for within the focal length region range in which zoom operation is carried out, based on the second position information, so as to set up the second optical state.

An optical instrument of the present invention has a first lens group and a second lens group capable of moving in an optical axis direction in order to perform optical zooming, and comprises a first drive section for moving the first lens group using a first actuator, a second drive section for moving the second lens group using a second actuator that is different from the first actuator of the first drive section, a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region with a second optical state established that is substantially identical to focal length of the first optical state that is established by positioning the first lens group and the second lens group at a first lens group position and a second lens group position that fall within the first position information, and focal length adjustment is possible at a shorter distance than a distance for which focal length adjustment is possible in the first optical state, and a control section for controlling the first drive section and the second drive section so that, when setting up an optical state where focal length adjustment is possible at a closer distance, based on the second position information, from of an optical state where the first lens group and the second lens group have been positioned at a position corresponding to the same focal length that falls within a focal length region range in which zoom operation is carried out, based on the first position information, the first lens group and the second lens group are respectively moved to positions corresponding to a focal length that is mutually different to that of the first position information, based on the second position information, so as to set up the second optical state.

An optical instrument of the present invention has a first lens group and a second lens group capable of moving in an optical axis direction in order to perform optical zooming, and comprises a first drive section for moving the first lens group using a first actuator, a second drive section for moving the second lens group using a second actuator that is different from the first actuator of the first drive section, a storage section for storing first position information relating to positions of the first lens group and positions of the second lens group corresponding to the same focal length that falls within a focal length region range in which zoom operations of the optical instrument are carried out, and second position information relating to position of the first lens group and position of the second lens group corresponding to a respectively different focal length that falls within the focal length region, and establishes a second optical state of higher shooting magnification than a first optical state, being substantially identical to focal length of the first optical state that is established by positioning the first lens group and the second lens group at a first lens group position and a second lens group position that fall within the first position information, and a control section for controlling the first drive section and the second drive section so as to move the first lens group and the second lens group to positions corresponding to a first optical state where the same angle of view is achieved as for a second optical state having a large shooting magnification based on the first position information, when establishing an optical state based on the first position information from the second optical state where shooting magnification is higher based on the second position information.

An optical instrument of the present invention has a first lens group and a second lens group capable of moving in an optical axis direction in order to perform optical zooming, and comprises a first drive section for moving the first lens group using a first actuator, a second drive section for moving the second lens group using a second actuator that is different from the first actuator of the first drive section, a storage section for storing first position information relating to position of the first lens group and position of the second lens group corresponding to the same focal length that falls within a focal length region range in which zoom operations of the optical instrument are carried out, and second position information relating to positions of the first lens group and position of the second lens group corresponding to different focal lengths that fall within the focal length region, and establishes a second optical state where focal length adjustment is possible at a shorter distance than a distance for which focal length adjustment is possible in the first optical state, being substantially identical to focal length of the first optical state that is established by positioning the first lens group and the second lens group at a first lens group position and a second lens group position that fall within the first position information, and a control section for controlling the first drive section and the second drive section so as to move the first lens group and the second lens group to positions corresponding to the first optical state where the same angle of view is achieved as for the second optical state, where the focal length adjustment is possible at a closer distance, based on the first position information, when shifting to establish an optical state based on the first position information from the second optical state where focal length adjustment is possible at a closer distance based on the second position information.

BRIEF DESCRIPTION OF THE DRAWINGS

FIG. 8A-FIG. 8D are drawings for describing a detection mechanism for sliding position of the zoom function switching member in the optical axis direction in the interchangeable lens of one embodiment of the present invention.

FIG. 9B is a graph showing drive trajectories of zoom groups of the interchangeable lens of one embodiment of the present invention, and shows a relationship between encoder position for a first zoom group (3G) and a second zoom group, and speed.

FIG. 10B is a graph showing one example of a relationship between zoom position and focus position of the interchangeable lens of one embodiment of the present invention, and shows position of a focus lens group with respect to focal length when macro mode has been set, for each macro position.

FIG. 11A-FIG. 11C are drawings for describing a spring provided between the first zoom group (3G) and the second zoom group (4G) of the interchangeable lens of one embodiment of the present invention, with FIG. 11A being a schematic drawing showing the arrangement of the first zoom group, the second zoom group and the spring, FIG. 11B being a drawing showing partitioned areas of 3G and 4G, and FIG. 11C being a drawing showing one example of boundaries of the partitioned areas.

FIG. 16B is a drawing for explaining mode switching, with the interchangeable lens of one embodiment of the present invention, and shows lens operation and focus position for each of macro 1-3 at the time of six mode transitions.

FIG. 17A-FIG. 17C are drawings showing one example of macro control data used in macro control, in the interchangeable lens of one embodiment of the present invention, with FIG. 17A showings soon position at the time of macro, FIG. 17B showing zoom position at the time of macro, and FIG. 17C showing lens drive (LD) position at the time of macro.

FIG. 19 is a drawing showing one example of a correspondence relationship between a 128 segment zoom encoder value (ZMENC value) transmitted to the camera body and fractional encoder value Ediv within the interchangeable lens, for the interchangeable lens of one embodiment of the present invention.

FIG. 20 is a drawing showing a relationship of drive positions for each mode when turning a power supply on and off, with the interchangeable lens of one embodiment of the present invention.

DETAILED DESCRIPTION OF THE PREFERRED EMBODIMENTS

Preferred embodiments using an interchangeable lens to which the present invention has been applied will be described in the following in accordance with the drawings. An interchangeable lens of a preferred one embodiment of the present invention is capable of being attached to and detached from a camera body. This camera body has an imaging section, with a subject image being converted to image data by this imaging section, and live view display and shooting carried out based on this converted image data. Communication is possible between the camera body and the interchangeable lens, with the interchangeable lens being operated in accordance with instructions from the camera body, and status of the interchangeable lens being transmitted to the camera body. Also, first and second zoom groups, and actuators for each zoom group, are arranged in the interchangeable lens, and it is possible to adjust focal length by moving the positions of these zoom lens groups.

Figure 1:
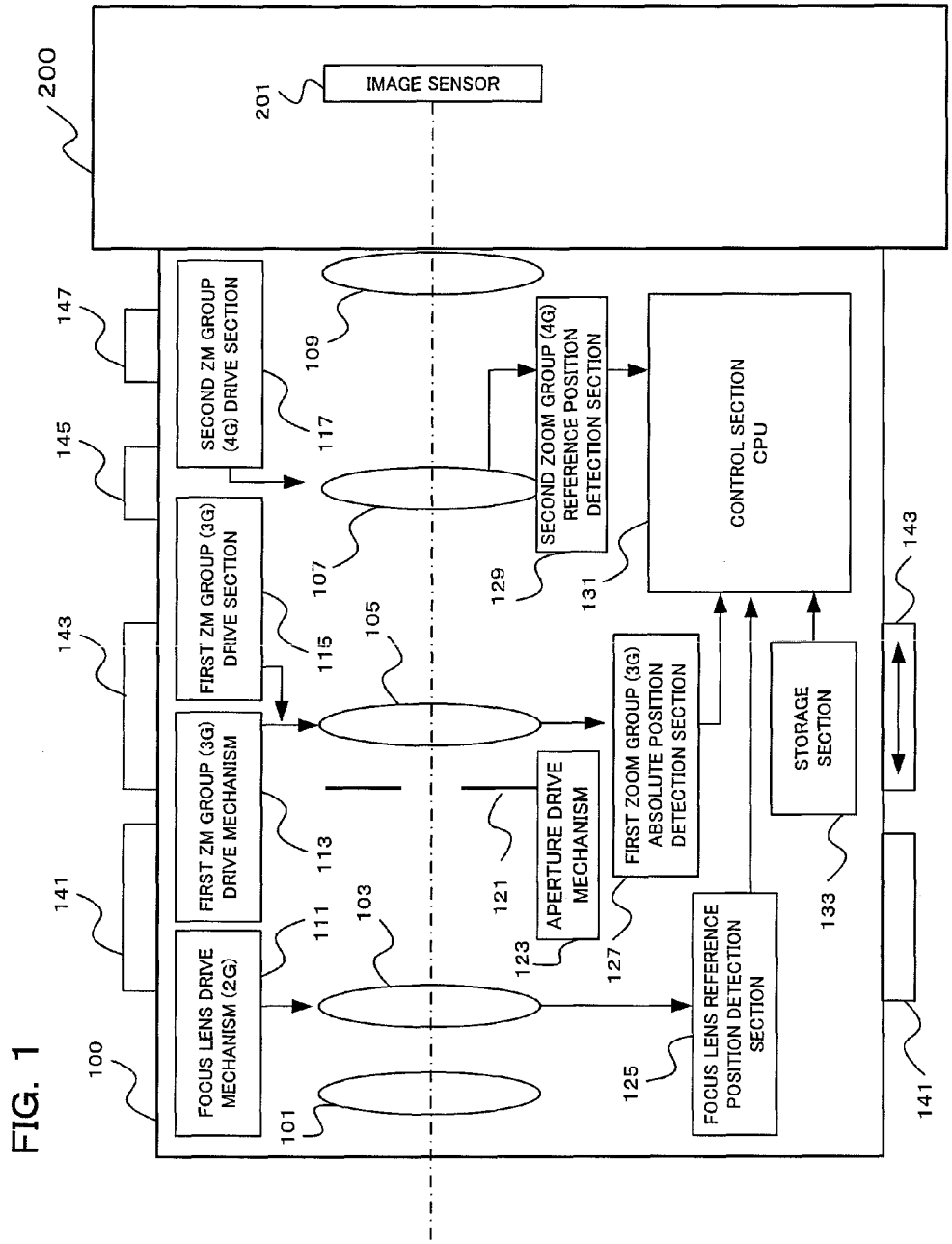
FIG. 1 is a block diagram showing the structure of an interchangeable lens of one embodiment of the present invention.
Figure 2:
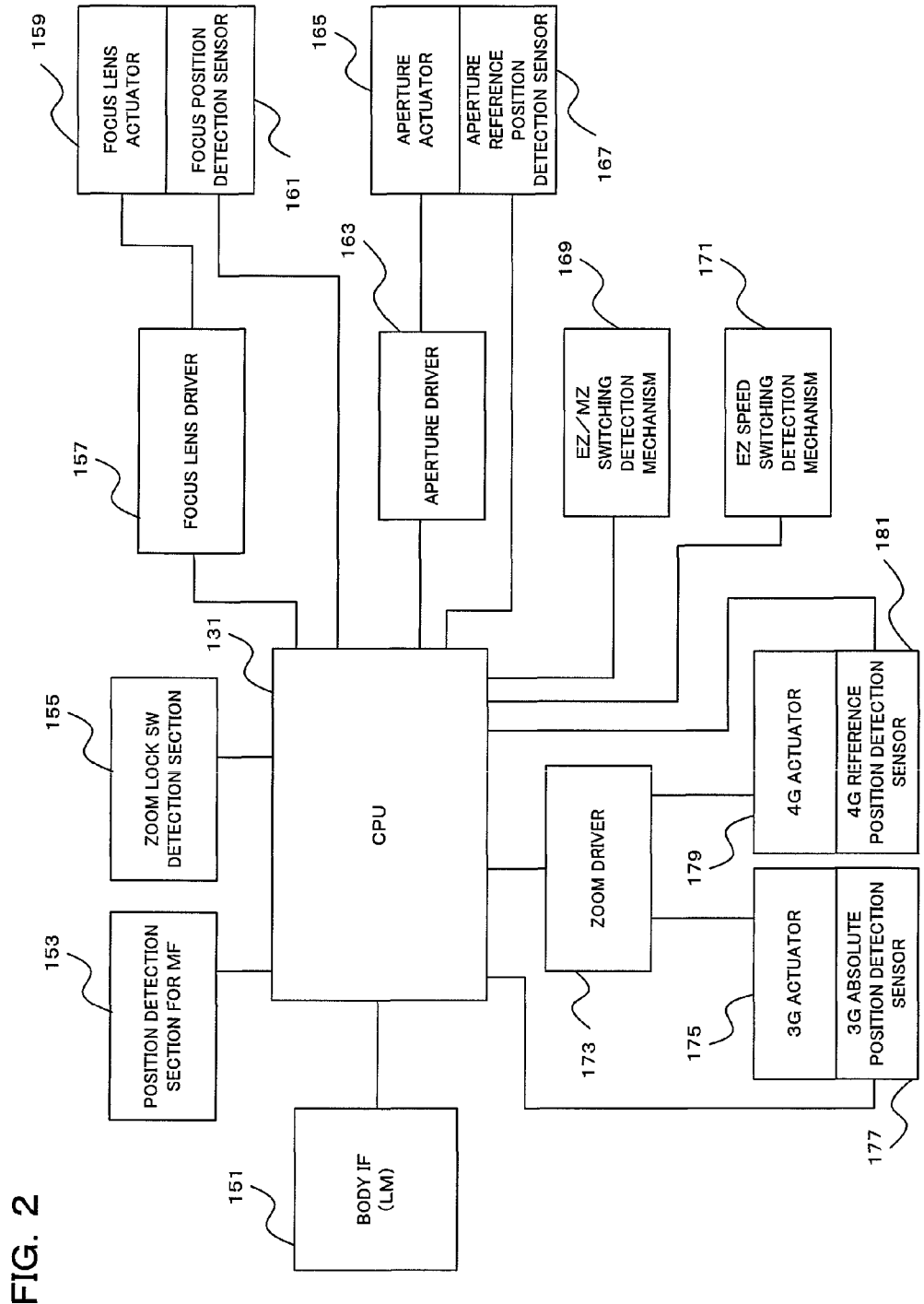
FIG. 2 is a functional block diagram of the interchangeable lens of one embodiment of the present invention.

FIG. 1 is block diagram showing the structure of an interchangeable lens 100, and FIG. 2 is a functional block diagram of the inside of the interchangeable lens 100. The interchangeable lens 100 is attached to or detached from a camera body 200. A total of five lens groups, namely a first lens group (1G) 101, a focus lens group (2G) 103, a first zoom group (3G) 105, a second zoom group (4G) 107, and a third lens group (5G) 109, are arranged on the same optical axis within the interchangeable lens 100, as an imaging optical system. Each lens group may also be constituted by a simple lens. The first lens group 101 and the fifth lens group 109 are fixed lens groups.

The focus lens group 103 constituting the second group (2G) within the imaging optical system is a lens group for focusing, and is capable of being moved in the optical axis direction by a focus lens drive mechanism (2G) 111. An actuator 159, such as a stepping motor, and a focus lens driver 157, are provided within the focus lens drive mechanism 111 (refer to FIG. 2), and drive of the focus lens 103 is carried out in accordance with control signals from a control section 131. A focus lens reference position detection section 125 has a focus position detection sensor 161 for detecting position from reference position of the focus lens group 103 (refer to FIG. 2), and outputs a detection result to the control section 131. The control section 131 carries out drive control of the focus lens group 103 by the focus lens drive mechanism 111 to a position for the focus lens group 103 to be driven to by calculating relative position from the reference position that has been detected by the focus lens reference position detection section 125, based on drive pulses of a stepping motor.

Also, an MF ring 141 is a rotation operation member for manual focus, and is provided to be rotatable around the outside of the interchangeable lens 100. An MF position detection section 153 (refer to FIG. 2) detects rotation direction and rotation amount of the MF ring 141, and outputs a detection result to the control section 131. If the user operates the MF ring 141, the control section 131 moves the focus lens group 103 backwards and forwards along the optical axis direction using electrical power, using the focus lens actuator 159 within the focus lens drive mechanism 111, in accordance with rotation direction and rotation amount that have been detected by the MF position detection section 153.

A zoom optical system is constituted by the first zoom group 105 constituting the third group (3G) within the imaging optical system, and the second zoom group 107 constituting the fourth group (4G) (hereafter zoom will sometimes be referred to as ZM). The first zoom group 105 and the second zoom group 107 are respectively independently driven, but a spring is provided between the two, and the two lens groups are brought together by this spring. This spring will be described later using FIG. 11A-FIG. 11C.

The first and second zoom groups 105 and 107 are switched between three modes, namely macro, electronic zoom (EZ) and mechanical manual zoom (MZ), by a sliding operation in the optical axis direction using a zoom function switching operation member 143. Macro mode is a mode adopted for close-up shooting. Electronic zoom mode is a mode for carrying out a zooming operation using an actuator, such as a stepping motor, at a drive speed corresponding to a rotation operation of the zoom function switching operation member 143. Mechanical manual zoom mode is a mode for carrying out a zooming operation manually, in accordance with a turning operation of the zoom function switching operation member 143. Switching positions of modes using the zoom function switching operation member 143 will be described later using FIG. 6.

The first zoom group 105 (3G) is moved in the optical axis direction by a first ZM group drive mechanism 113 or a first ZM group drive section 115. The first ZM group drive mechanism 113 moves the first zoom group 105 in the optical axis direction by manual operation by the user when mechanical manual zoom mode is set, while the first ZM group drive section 115 moves the first zoom group 105 in the optical axis direction using an actuator when electronic zoom mode is set.

The first ZM group drive section 115 has a zoom driver 173 and a 3G actuator 175 (refer to FIG. 2). A stepping motor is used as the 3G actuator, and fine control is carried out using micro step drive. With this embodiment, a stepping motor has been adopted, but besides a stepping motor it is also possible to adopt another drive source, such as a DC motor.

If the user performs an operation to move the zoom function switching operation member 143 in the optical axis direction to switch to mechanical manual zoom, the zoom function switching operation member 143 functions as a manual zoom ring. At this time, the first ZM group drive mechanism 113 causes the first zoom group 105 to move in the optical axis direction in accordance with rotation direction and rotation amount of the zoom function switching operation member 143.

If the user performs an operation to move the zoom function switching operation member 143 in the optical axis direction to switch to electronic zoom, the zoom function switching operation member 143 functions as an electronic zoom ring. At this time, the first ZM group drive section 115 causes the first zoom group 105 to move towards the infinity end or the close-up end, under the drive force of an actuator within the first ZM group drive section 115, in accordance with rotation direction of the zoom function switching operation member 143. At this time the first zoom group 105 is driven at a zooming speed corresponding to rotation amount (rotation angle) of the zoom function switching operation member 143. Switching of the first ZM group drive mechanism 113 and the first ZM group drive section 115 using the zoom function operation member 143 will be described later using FIG. 3.

A first ZM group absolute position detection section 127 has a linear encoder as a 3G absolute position detection sensor 177, and absolute position of the first zoom group 105 is detected by this linear encoder. The detection result from the ZM group absolute position detection section 127 (3G absolute position detection sensor 177) is output to the control section 131. The linear encoder will be described later using FIG. 5A and FIG. 5B.

The second zoom group (4G) 107 constituting the zoom optical system is moved in the optical axis direction by a second group drive section 117. The second group drive section 117 has a zoom driver 173 and a 4G actuator 179 (refer to FIG. 2). The second zoom group 107 carries out a tracking operation to a position corresponding to the position of the first zoom group 105. Specifically, position of the second zoom group 107 is moved by the 4G actuator 179 in accordance with position of the first zoom group that has been detected by the ZM group absolute position detection section 127 so as to obtain a focused image that has a specified shooting angle. In the event that mechanical manual zoom mode has been set, the first zoom group 105 is driven manually by the user, but the second zoom group 107 is electrically driven in accordance with position of the first zoom group 105 even if mechanical manual zoom mode has been set.

As the 4G actuator 179 within the second group drive section 117, a stepping motor is adopted in this embodiment, similarly to the first ZM group drive section 115, but besides a stepping motor another drive source may also be adopted, such as a DC motor. Also, with this embodiment the zoom driver 173 doubles as a driver circuit for the first ZM group drive section 115 and the second group drive section 117, but driver circuits respectively dedicated to the first ZM group drive section 115 and the second group drive section 117 may also be provided.

A second zoom group reference position detection section 129 detects reference position of the second zoom group 107, and outputs to the control section 131. Specifically, the second ZM group reference position detection section 129 uses a photo interrupter (PI) of a 4G reference position detection sensor 181 to acquire a reference position, and position is controlled using detection of relative position from this reference position. Here, reference position is a position at a specified time, and relative position is calculated by counting PI from this position.

The reason why position of the first zoom group 105 is controlled by carrying out absolute position detection using the first ZM group absolute value detection section 127, and the position of the second lens group 107 is controlled by detecting relative position using the second ZM group reference position detection section 129, is as follows. Here, absolute position detection refers to ascertaining an absolute position, for example, and relative position detection refers to ascertaining a position at a relative position with respect to a reference absolute position. In the case of using a stepping motor as the actuator, it is possible to carry out control of relative position in accordance with a number of steps of the stepping motor. It is therefore possible to simplify the mechanical structure, regarding use of space, relative position detection requires less space, and it is possible to reduce cost.

However, with this embodiment, the drive mechanism for the first zoom group 105 and the second zoom group 107 is switched in accordance with a switching operation of the zoom function switching operation member 143, and in the case of operating with mechanical manual zoom, excitation position of the stepping motor is offset. Also, with mechanical manual zoom, since it is driven with external force, a pulse count of the stepping motor is also off. Therefore, if relative position detection is carried out in order to correct the offset position, it is necessary to detect an initial position at the time of initial drive every time the zoom function is switched. This initial drive every time mode function is switched results in a wait for the initial drive time, which degrades operability.

With this embodiment, therefore, initial drive is avoided by detecting absolute position of one of the zoom lens groups. If absolute value detection is performed for two zoom lens groups together, space also becomes necessary and cost is increased. Therefore, operability, cost, and utilization of space are all improved by performing absolute position detection for one zoom lens group and performing relative position detection for the other zoom lens group.

An aperture 121 is arranged in an optical path of the imaging optical system, and drive control for opening amount of the aperture is performed by an aperture drive mechanism 123. The aperture drive mechanism 123 comprises an aperture actuator 165, an aperture driver 163, and an aperture reference position detection sensor 167 (refer to FIG. 2). The aperture actuator 165 uses a stepping motor, and fine control is carrying out using micro step drive. The aperture driver 163 is an aperture actuator drive circuit. The aperture reference position detection sensor 167 acquires reference position of the aperture, and controls position by relative position detection. A photo interrupter (PI) is used in reference position detection.

The zoom function switching operation member 143 is provided so as to be capable of sliding and turning on the outside of the interchangeable lens 100, and by sliding the position in the optical axis direction backwards and forwards switching between macro, electronic zoom (EZ) and mechanical manual zoom (MZ) is carried out. An EZ/MZ switching detection mechanism 169 carries out detection of switching position as a result of sliding operation of the zoom function switching operation member 143, and outputs to the control section 131 (refer to FIG. 2). In FIG. 1, switching is carried out by sliding the zoom function switching operation member 143 laterally, or in other words sliding towards the subject or towards the camera. The EZ/MZ switching detection mechanism 169 has a detection section, such as a Gray code encoder, and switching position due to a slide operation is detected by this detection section. The Gray code encoder will be described later using FIG. 8A-FIG. 8D.

If the zoom function switching operation member 143 is slid in the optical axis direction to switch to mechanical manual zoom, it is possible to freely rotate the zoom function switching operation member 143, and the first zoom group is driven manually without electrical control in accordance with the amount of rotational movement, and it is possible to change the focal length.

On the other hand, if the zoom function switching operation member 143 is slid in the optical axis direction to switch to electronic zoom, the zoom function switching operation member 143 becomes configured so that it can only be rotated in a specified rotational range by a mechanical mechanism. At this time, by moving the zoom function switching operation member 143 in a rotational direction, electronic zoom is carried out at a speed corresponding to rotation angle (rotation amount). With this embodiment, the drive is carried out in three speed stages in accordance with rotational angle. The EZ speed switching detection mechanism 171 (refer to FIG. 2) detects rotational angle and rotation direction in the wide/telephoto direction of the zoom function switching operation member 143 at the time of electronic zoom, and outputs detection results to the control section 131. In this embodiment, the EZ speed switching detection mechanism 171 has a Gray code encoder, and encodes rotational angle of the zoom function switching operation member 143 for output to the control section 131.

If the zoom function switching operation member 143 is slid in the optical axis direction to select macro, then rotation operation of the zoom function switching operation member 143 is prohibited, and the first zoom group 105 and the second zoom group 107 are electrically driven to predetermined positions that are stored in a storage section 133. The predetermined positions are optical positions suitable for macro shooting. The focus lens group 103 may also be moved to a predetermined position.

A zoom lock switch 147 is a mechanical lock structure arranged on the outside of the interchangeable lens 100. Specifically, if the zoom function switching operation member 143 is always made slidable in the optical axis direction, there is a possibility that the mode may be switched contrary to the intention of the user. Therefore, sliding of the zoom function switching operation member 143 to perform a switching operation for macro, electronic zoom and mechanical manual zoom is only permitted when the zoom lock switch 147 is operated. With this embodiment, the detection of mode switching is carried out by detection of the zoom function switching operation member 143, but it is also possible to carry out state detection for state of the zoom lock switch 147 in a zoom lock SW detection section 155.

A function button 145 is arranged on the outside of the interchangeable lens 100 and provided with a switch that is turned on and off by a pressing operation by the user, and the state of this switch is output to the control section 131. This function button 145 can carry out switching of various modes such as the functional examples 1-5 shown below, in combination with operating states of other operating members. The functional examples 1-5 may have all of the functions illustrated, or only some of the functions, and may also be combined with other functions. Also, the function button 145 is not limited to a push button switch, and other operation members may be used, such as a slide switch etc.

Functional example 1: In a macro mode state where the zoom function switching operation member 143 has been set at the macro position, if the function button 145 is operated, in the event that there are a plurality of macro positions a macro position is sequentially switched every time the function button is pressed (with the example shown in FIG. 10B macro 1-macro 3 are provided).

Functional example 2: If the function button 145 is operated in the electronic zoom (EZ) mode state, the photographing lens is sequentially driven to a wide end position, a standard position, and a telephoto end position with each operation. Alternatively, the photographing lens may be driven to preferred positions that have been set at the body side (preset positions).

Functional example 3: Regardless of which of the electronic zoom, mechanical manual zoom and macro mode has been set, function is switched in the order aperture→ISO speed→AWB (auto white balance) with each operation of the function button 145, and if the MF ring 141 is turned respective operation amount is changed. Conventionally, in order to set these functions, such as aperture at the camera body side, it was necessary to look away from the subject temporarily. However, with this embodiment there is the advantage that it is possible to easily switch control values such as ISO speed etc. with the interchangeable lens 100 supported in the hand, while observing the subject. Control values are not limited to the above-described parameters, and it is possible to apply parameters for other controls.

Functional example 4: If the function button 145 is operated in the electronic zoom (EZ) mode state, macro mode is entered and each lens group is driven to the macro position.

Functional example 5: If the function button 145 is operated in the electronic zoom (EZ) mode state, macro mode is switched to. If the zoom function switching operation member 143 functioning as a zoom ring is turned in this state, each lens group is driven to a plurality of pre-registered macro positions. This function is not limited to using the zoom function switching operation member 143, and the MF ring 141 may also be utilized.

The control section 131 has a CPU, and is connected to sensors such as the focus lens reference position detection section 125, the ZM group absolute position detection section 127 that includes the 3G absolute position detection sensor 177, the second ZM group reference position detection section 129 that includes the 4G reference position sensor 181, the electrical Z/manual Z switching detection mechanism 169, the EZ speed switching detection mechanism 171 etc. The control section 131 is also connected to the focus lens drive mechanism 111 that includes the focus lens driver 157, the aperture drive mechanism 123 that includes the aperture actuator 165, the first ZM group drive section 115 that includes the 3G actuator 175, and the second ZM group drive section 117 that includes the 4G actuator 179 etc. The control section 131 carries out internal control of the interchangeable lens 100, for example, various controls such as electronic zoom control, mechanical manual zoom control, macro control, manual focus control, autofocus control, aperture control etc. by outputting control commands to actuators etc. depending on detection results of the above described sensors etc., in accordance with programs that have been stored in the storage section 133.

The control section 131 also carries out drive control of the focus lens group (2G) 103, the first zoom group (3G) 105 and the second zoom group (4G) 107 in the event that there has been a change of mode, such as electronic zoom (EZ) mode, mechanical manual zoom (MZ) mode, macro mode etc. Also, at the time of zoom control, the control section 131 controls the second zoom group drive section 117 based on detection output of the second ZM group reference position detection section 129 in accordance with position of the first zoom group 105 that has been detected by the ZM group absolute position detection section 127, so that the position of the second zoom group 107 is such that a focused subject image is obtained that has desired shooting angle of view. Also, at the time of macro control, drive control of the focus lens group (2G) 103, first zoom group (3G) 105 and second zoom group (4G) 107 is carried out in accordance with the macro mode that has been set (macro 1-macro 3). The control section 131 also carries out communication with control sections within the camera body 200 via a body IF 151, and carries out control within the interchangeable lens 100 in accordance with control commands output by the camera body 200.

The storage section 133 is an electrically rewritable nonvolatile memory, such as flash memory, and as well as the previously described programs for causing operation of the control section 131, stores positional relationships of the second zoom group 107 in accordance with position of the first zoom group 105. As will be described later, various parameters shown in FIG. 11C, FIG. 17A-FIG. 17C, FIG. 19 etc. are also stored.

An image sensor 201 is arranged within the camera body 200, on the optical axis of the imaging optical system. A subject image that has been formed by the imaging optical system is converted to image signals by the image sensor 201, and subjected to live view display on a display section by non-illustrated circuits etc., and image data is stored in a storage medium.

Figure 3:
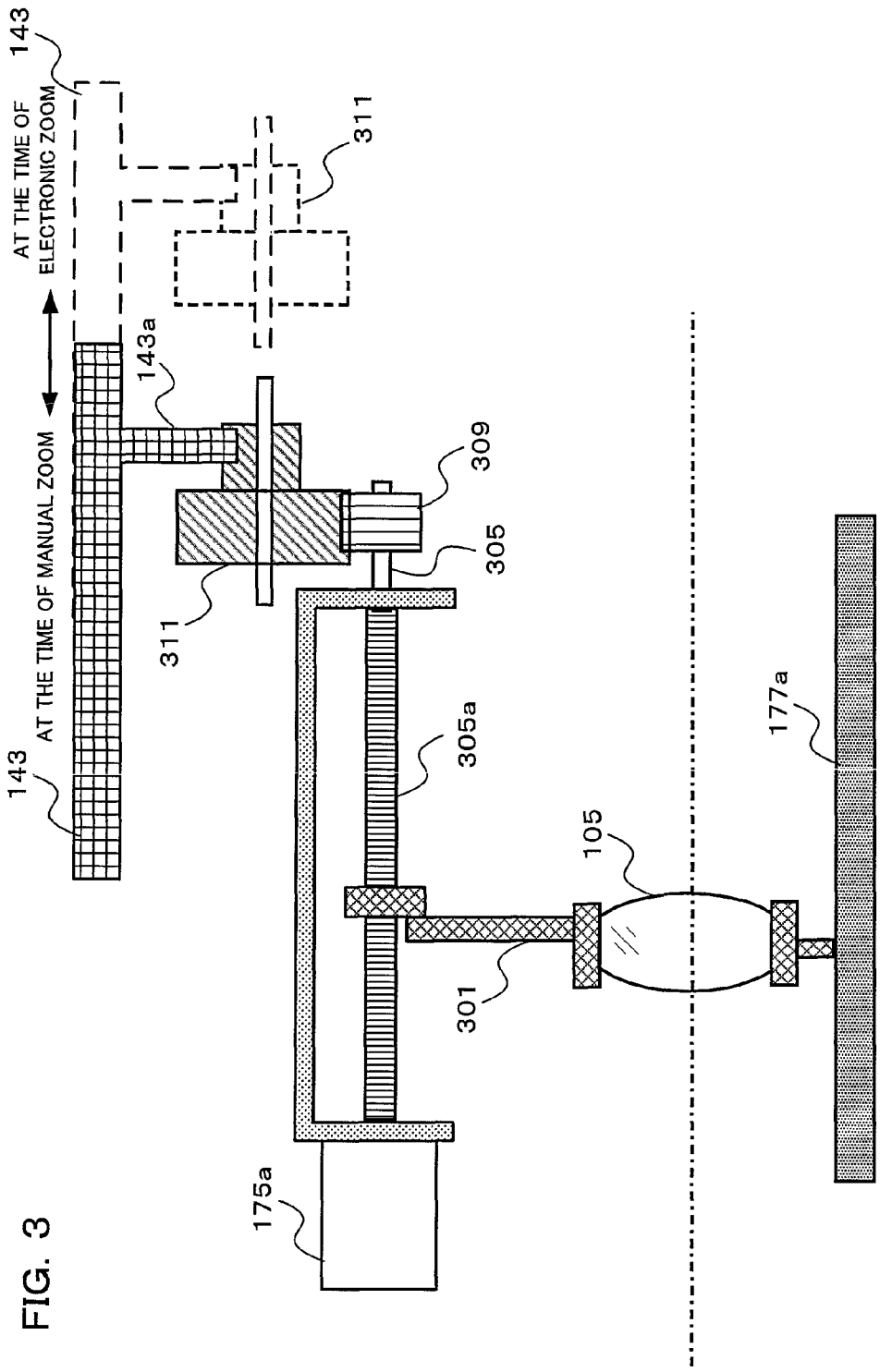
FIG. 3 is a cross sectional diagram showing the structure of a first zoom group of the interchangeable lens of one embodiment of the present invention.

Next, the first zoom group 105 and its switching mechanism will be described using FIG. 3. The zoom function switching operation member 143, that is provided capable of rotation around the outside of the interchangeable lens 100 and sliding in the optical axis direction, is capable of movement in the left right direction on the sheet of FIG. 3. A projecting section 143a of the zoom function switching operation member 143 is fixed to a step-up gear 311. As a result, if the zoom function switching operation member 143 is slid along the optical axis direction the step-up gear 311 also moves along the optical axis direction. In FIG. 3, a dashed line shows the position at the time of electronic zoom, and a solid line shows position at the time of mechanical manual zoom.

The step-up gear 311 meshes with a motor shaft gear 309. At the time of mechanical manual zoom, if the zoom function switching operation member 143 is turned around the outside of the interchangeable lens 100, the step-up gear 311 also turns, and the motor shaft gear 309 also rotates. This motor shaft gear 309 is supported by a motor shaft 305, and the motor shaft 305 is integrally formed with a rotation shaft of a stepping motor 175a.

A screw thread 305a is provided on part of the surface of the motor shaft 305, and a lens support section 301 is engaged on this thread 305a. The lens support section 301 holds the first zoom group 105 close to the center, and at the other end contacts a linear encoder 177a.

With this type of structure, if the zoom function operation member 143 is slid to the left side in FIG. 3, mechanical manual zoom mode is switched to. At the time of mechanical manual zoom, the step-up gear 311 and the zoom function switching operation member 143 are linked by a clutch system. If the zoom function switching operation member 143 is subjected to a rotation operation, the motor shaft gear 309 is rotated, overcoming the detent torque of the stepping motor 175a, the motor shaft 305 that is integral with the motor shaft gear 309 also rotates, and the first zoom group 105 moves in the optical axis direction.

If the zoom function operation member 143 is slid to the right side in FIG. 3, electronic zoom mode is switched to. At the time of electronic zoom, the step-up gear 311 is disengaged from the motor shaft gear 309, and the first zoom group 105 does not move even if the zoom function operation member 143 is subjected to a rotation operation. At this time instructions are sent from the control section 131→the zoom driver 173→the 3G actuator 175 (stepping motor 175a). In this way, the motor shaft 305 rotates and the first zoom group 105 is driven.

The ZM group absolute position detection section 127 (3G absolute position detection sensor 177) always detects absolute position of the first zoom group 105, regardless of a mechanical manual zoom, electronic zoom or macro state, and outputs the detected absolute position to the control section 131. The 3G absolute position detection sensor 177 adopts the linear encoder 177a in this embodiment. This linear encoder 177a will be described later using FIG. 5A and FIG. 5B.

Figure 4:
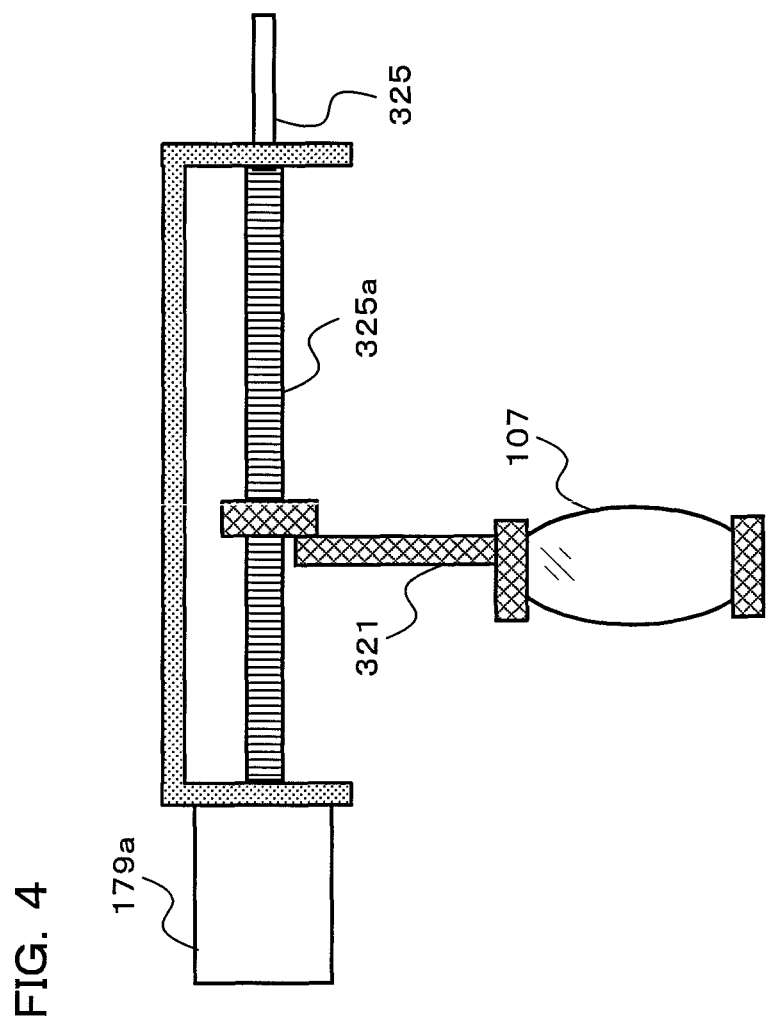
FIG. 4 is a cross sectional diagram showing the structure of a second zoom group of the interchangeable lens of one embodiment of the present invention.

Next, the second zoom group 107 and its drive mechanism will be described using FIG. 4. Position of the second zoom group 107 is controlled to a relative position by a stepping motor, by the photo interrupter (PI), as a 4G reference position detection sensor 181, detecting absolute position of a reference, regardless of whether electronic zoom, mechanical manual zoom, or macro mode is set.

A rotational shaft of the stepping motor 179a is integral with a motor shaft 325. A thread 325a is provided on part of the surface of the motor shaft 325, and a lens support section 321 is engaged with this thread 325a. The lens support section 301 holds the second zoom group 107 close to the center.

With this type of structure, at the time of mechanical manual zoom the second zoom group 107 is relatively driven by the stepping motor 179a. The second zoom group 107 is not driven by a manual operation from outside. The control section 131 references the storage section 133, and electrically performs tracking drive to a position of the second zoom group 107 corresponding to the first zoom group 105. Also, at the time of electronic zoom, electrical drive is performed in accordance with speed instructions received in accordance with rotation direction of the zoom function switching operation member 143. Reference position is known from initial drive at the time of power up, and positional control is carried out to a relative position based on a number of steps of the stepping motor 179a.

Figure 5A:
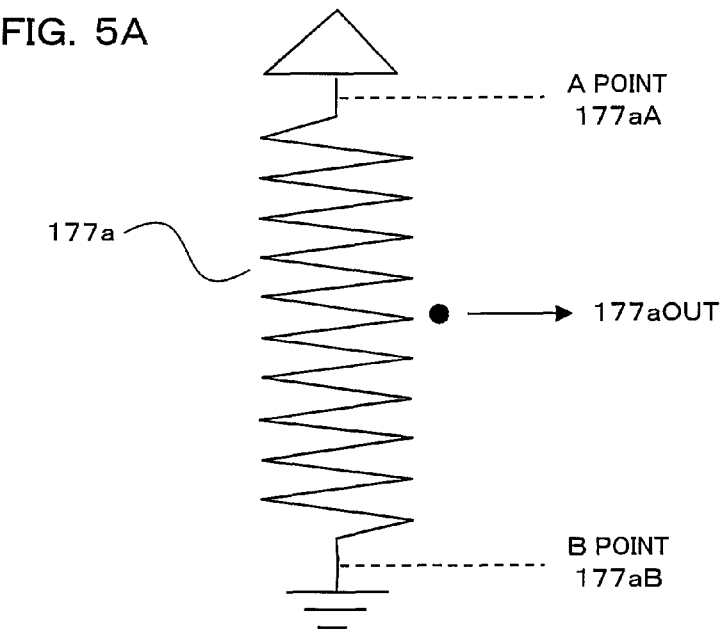
FIG. 5A and FIG. 5B are for a linear encoder of the interchangeable lens of one embodiment of the present invention, with FIG. 5A being a drawing showing the electrical structure of the linear encoder, and FIG. 5B being a graph showing an output characteristic of the linear encoder.
Figure 5B:
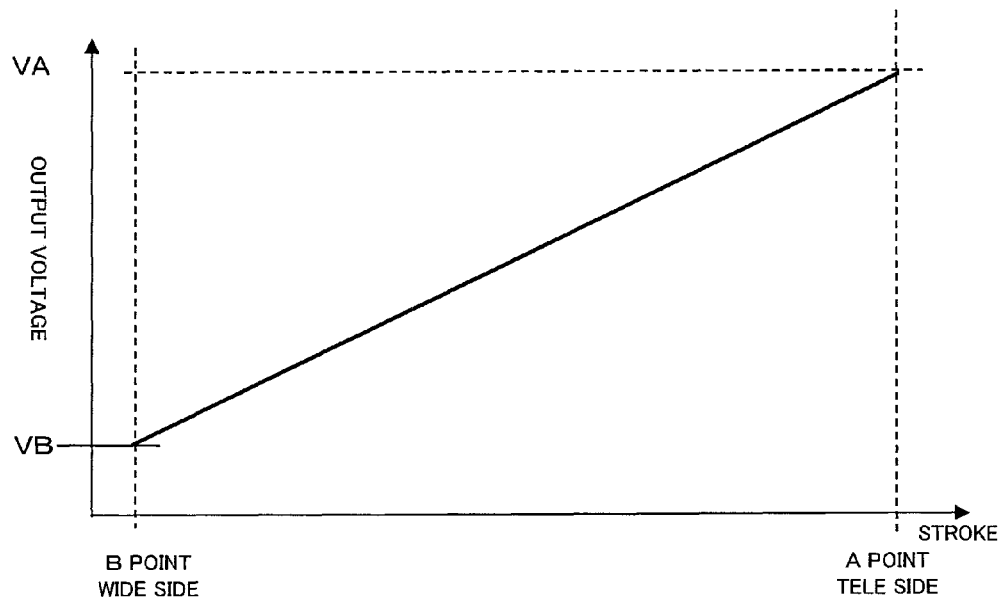

Next, the linear encoder 177a shown in FIG. 3 will be described using FIG. 5A and FIG. 5B. This linear encoder 177a is a constituent part of the ZM group absolute position detection section 127, and detects an absolute position of the first zoom group 105. The linear encoder 177a is a resistive slider type electrical component, as shown in FIG. 5A, with point A (177aA) being connected to a power supply Vcc, point B (177aB) being connected to ground (GND), and an output point 177aOUT being mechanically slid in accordance with position of the first zoom group 105. If the position of the output point 177aOUT is varied, a resistively divided output voltage varies as shown in FIG. 5B. Output voltage of the linear encoder 177a is converted to digital data by an AD converter, and output to the control section 131.

Figure 6:
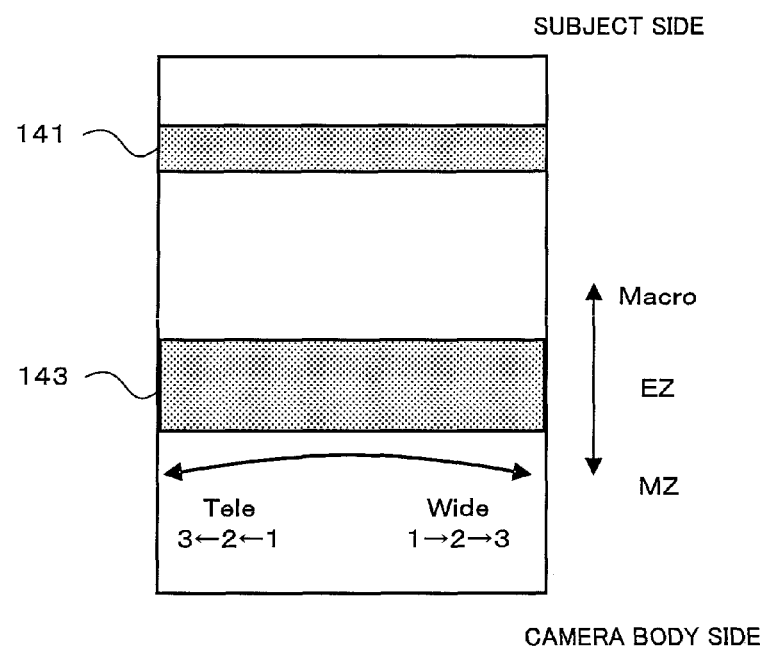
FIG. 6 is a drawing for describing operating states of a zoom function switching member of the interchangeable lens of one embodiment of the present invention.

Next, switching of zoom speed settings at the time of electronic zoom will be described using FIG. 6. FIG. 6 is a drawing of the outer periphery of the interchangeable lens 100 expanded out to a plan view. The MF ring 141 functioning as a manual focus ring is arranged on the outer periphery of the interchangeable lens 100, toward the subject side of the interchangeable lens 100, while the zoom function switching operation member 143 functioning as a zoom ring is arranged toward the camera body side of the interchangeable lens 100.

As described previously, the zoom function switching operation member 143 is capable of sliding in the optical axis direction (also called the Z direction), and if it is slid in the Z direction the mode of the interchangeable lens 100 is sequentially switched, from the subject side, from macro mode, to electronic zoom (EZ) mode, to mechanical manual zoom (MZ) mode.

When electronic zoom mode is set, if the zoom function switching operation member 143 is rotated in a clockwise direction (to the right in FIG. 6), zooming is performed to the wide end, while if the zoom function switching operation member 143 is rotated in a counter clockwise direction (to the left in FIG. 6) zooming is performed to the telephoto end. It is possible to adjust the zooming speed in accordance with rotation amount (rotational angle) from the center position at this time. A center position is made a neutral position (a position that is not driven to either the wide end or the telephoto end), and if rotation amount from the center position is large zooming speed becomes high speed. With the illustrated example, there are three stages of speed change, namely, speed 3 (high-speed)>speed 2 (medium speed)>speed 1 (low speed).

Figure 7A:
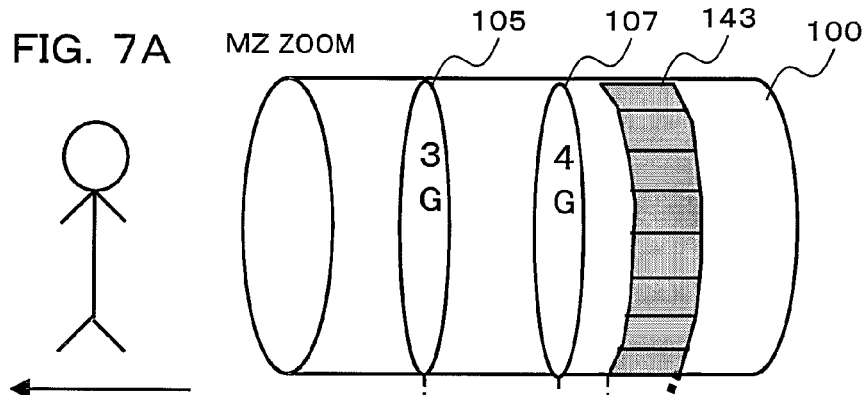
FIG. 7A-FIG. 7C are drawings showing movement of lenses at the time of switching each mode, in the interchangeable lens of one embodiment of the present invention, with FIG. 7A showing the situation at the time of mechanical manual zoom, FIG. 7B showing the situation at the time of electronic zoom, and FIG. 7C showing the situation at the time of macro mode.
Figure 7B:
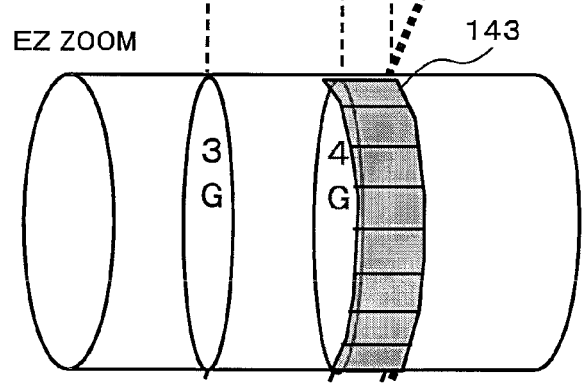
Figure 7C:
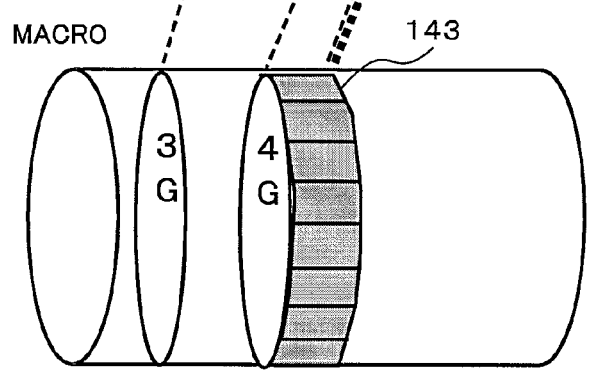

Lens operation at the time of switching each mode, when the zoom function switching operation member 143 has been slid, will be described using FIG. 7A-FIG. 7C. FIG. 7A shows a positional relationship between the first zoom group (3G) 105 and the second zoom group (4G) 107 when mechanical manual zoom has been switched to. In FIG. 7A-FIG. 7C, the left side is the subject side on the right side is the camera body 200 side.

If the zoom function switching operation member 143 is slid to the subject side in mechanical manual zoom mode, the electronic zoom mode shown in FIG. 7B is switched to. As will be understood from FIG. 7A and FIG. 7B, positions of the first and second zoom groups 105 and 107 do not move even if there is a switch from mechanical manual zoom to electronic zoom. In this case, as was described using FIG. 3, all that happens is that a power transmission mechanism is switched from manual to electrical.

If the zoom function switching operation member 143 is slid to the subject side in electronic zoom mode, the macro mode shown in FIG. 7C is switched to. At this time, the positions of the first and second zoom groups 105 and 107 move. As described previously, the positions of the first and second zoom groups 105 and 107 for this macro position are positions that are suitable for macro photography, and are stored in the storage section 133.

Detection of slide position of the zoom function switching operation member 143 in the optical axis direction is carried out by the Gray code encoder shown in FIG. 8A-FIG. 8D. A rotor linked to operation of this zoom function switching operation member 143 is provided on the zoom function switching operation member 143, and positional detection of the zoom function switching operation member 143 in the optical axis direction is carried out by varying contact position of an intercept 341 provided on the rotor with Gray code patterns 343a-343d of an encoder flexible substrate 343.

Detection patterns of the encoder flexible substrate 343 constitute a Gray code encoder, as shown in FIG. 8B. MODE-ENC1 and MODE-ENC2 of the control section 131 shown in FIG. 8A have an internally set pull up connection, and constitute input settings. MODE-ENC1, MODE-ENC2 and ENCSPEEDCOM are CPU I/O ports of the control section 131, and these I/O ports are set as shown in FIG. 8C.

The intercept 341 moves in accordance with sliding of the zoom function switching operation member 143. At a position where the intercept 341 is in contact with the Gray code encoder patterns 343a-343d there is conduction to ENC-COM, resulting in an L input to MODE-ENC1 and MODE-ENC2 of the control section 131. On the other hand, at the position where the intercept 341 does not contact the encoder patterns, there is no conduction with ENC-COM, and MODE-ENC1 and MODE-ENC2 of the control section 131 receive H input due to the pull-up setting. As shown in FIG. 8D, which one of macro mode, electronic zoom mode or mechanical manual zoom is set is determined in accordance with the inputs MODE-ENC1 and MODE-ENC2 of the control section 131.

Next, drive trajectories of the first and second zoom groups 105 and 107 will be described for synchronous pulse position table and synchronous speed table using FIG. 9A-FIG. 9C. With this embodiment, units of a virtual encoder representing zoom position are expressed as Ediv. The wide end has small numerical values while the telephoto end has large numerical values, and with the example shown in FIG. 9A-FIG. 9C from the wide end to the telephoto end is divided into 1024 divisions. Ediv corresponds to focal length, with from 25-994 Ediv being a usage range for electronic zoom (EZ), and 0-1023 Ediv being usage range including mechanical manual zoom (MZ).

The position of 25 Ediv is made a position of 100 Pls for the first zoom group (3G) 105 and a position of 100 Pls for the second zoom group (4G) 107, and this position is made the reference position. Pls corresponds to a single step drive amount of the stepping motor 175*a* and the stepping motor 179*a*. At each Ediv position, if the first zoom group 105 and the second zoom group 107 are at respectively corresponding positions of the synchronous pulse position table, a relationship exists where an optical characteristic for a corresponding focal length is obtained. A synchronous pulse position table for the first zoom group (3G) 105 and the second zoom group (4G) 107 with respect to encoder position Ediv, such as shown in FIG. 9A, is stored in the storage section 133.

Figure 9A:
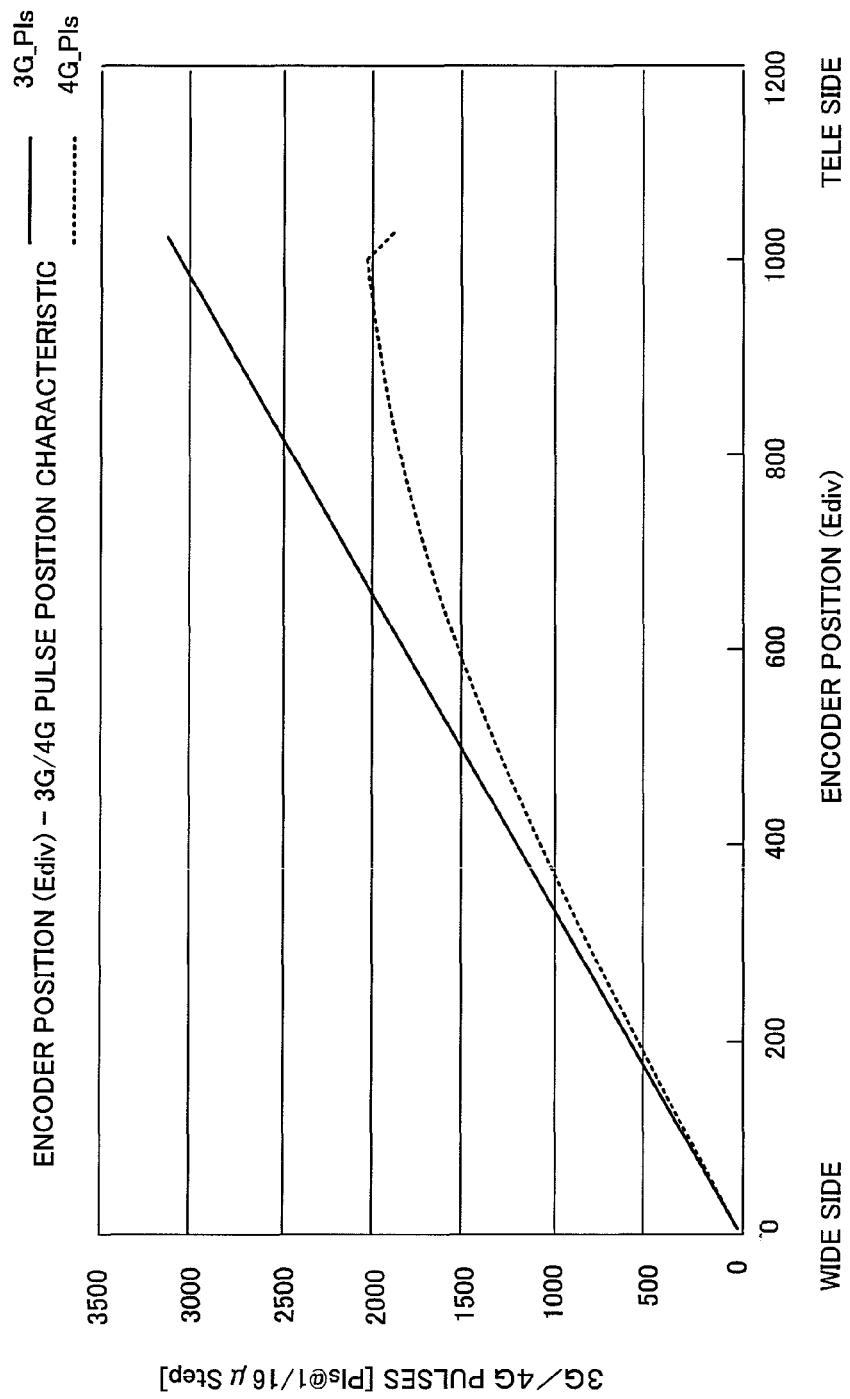
FIG. 9A is a graph showing drive trajectories of zoom groups of the interchangeable lens of one embodiment of the present invention, and shows a relationship between encoder position for a first zoom group (3G) and a second zoom group, and pulse position.

When the first zoom group (3G) 105 and the second zoom group (4G) 107 are continuously driven, an optical characteristic for a corresponding focal length is obtained when driving with the positional relationship for 3G and 4G being held at the synchronous pulse position table relationship as is shown in FIG. 9A. Also, at this time, when driving the zoom groups with drive speeds of 3G/4G at each Ediv maintaining the relationship of the synchronous speed table as shown in FIG. 9B, angle of view fluctuation is kept constant. A synchronous speed table such as shown in FIG. 9B is stored in the storage section 133.

The meaning of having units of 1 Ediv is that Pls position offset of less than 1 Ediv is maximum offset that can not be confirmed as image degradation. However, the definition of 1 Ediv unit is not limited, and the relationship of 1 Ediv=1 Pls is also possible for example.

FIG. 9A is a graph with the horizontal axis showing encoder position and the vertical axis showing pulse position for the first zoom group (3G) and the second zoom group (4G). Pulse position is a position corresponding to a number of steps using the stepping motor. At each Ediv, when Pls positions of the first zoom group (3G) 105 and the second zoom group (4G) 107 are positions shown on the vertical axis, a positional relationship is established whereby an optical characteristic at the Ediv positional is obtained.

The position of the wide end, with electronic zoom, is made 25 Ediv, and at that position a positional relationship between the first zoom group (3G) 105 and the second zoom group (4G) 107 is adjusted, and that position is made a 100 Pls position for 3G and 4G respectively, and made the reference position. With the interchangeable lens 100 of this embodiment, position at the wide end is obtained through adjustment, and after that positions toward the telephoto end are design certified at relative Pls positions. However, this is not limiting, and it is also possible to adjust position of the second zoom group (4G) 107 with respect to a Pls position of the first zoom group (3G) 105 towards the telephoto end (for example, 994 Ediv) or an intermediate Ediv position, interpolate pulse position from adjusted positions for both ends, and guarantee optical position of 3G and 4G.

FIG. 9B is a graph with the horizontal axis showing encoder position Ediv and the vertical axis showing speed of the first zoom group (3G) 105 and the second zoom group (4G) 107. At each Ediv position, when the drive speed of 3G and 4G is drive at the speed shown on the vertical axis, angle of view change between each Ediv is constant (angle of the view fluctuation constant speed). When storing continuous images, such as with movie shooting, if drive is carried out at the angle of view fluctuation constant speed it is possible to acquire images with smooth focal length change.

Also, as shown in FIG. 9B, an intermittent drive region and a non-intermittent drive region are provided, with intermittent drive being carried out in the intermittent drive region and non-intermittent drive being carried out in the non-intermittent drive region. With non-intermittent drive, 3G and 4G are driven at synchronous positions with respect to positional variation at each Ediv position, and drive is such that drive speed at this time becomes a synchronous speed. In this way, focal length is changed in a state where an optical characteristic of constant angle of view fluctuation is obtained.

3G and 4G have different optical sensitivity. Therefore, since at a given Ediv position drive is such that angle of view fluctuation is constant, a 4G drive amount for a 1 Ediv interval is a region constituting 1 Pls or less. With drive using a stepping motor, it is not possible to drive by less than 1 Pls. To increase the number of divisions for micro step drive, there are also methods that allow Pls sensitivity such that 1 Pls or less is not encountered. However, if Pls number to be driven becomes massive or Ediv is defined to have a fine Pls number, it will only result in control being complicated.

With this embodiment, therefore, intermittent drive is carried out in a region where a drive amount becomes 1 Pls or less, and a region where an extremely slow speed is reached. With intermittent drive only position tracking is carried out at each Ediv, to perform intermittent drive.

Figure 9C:
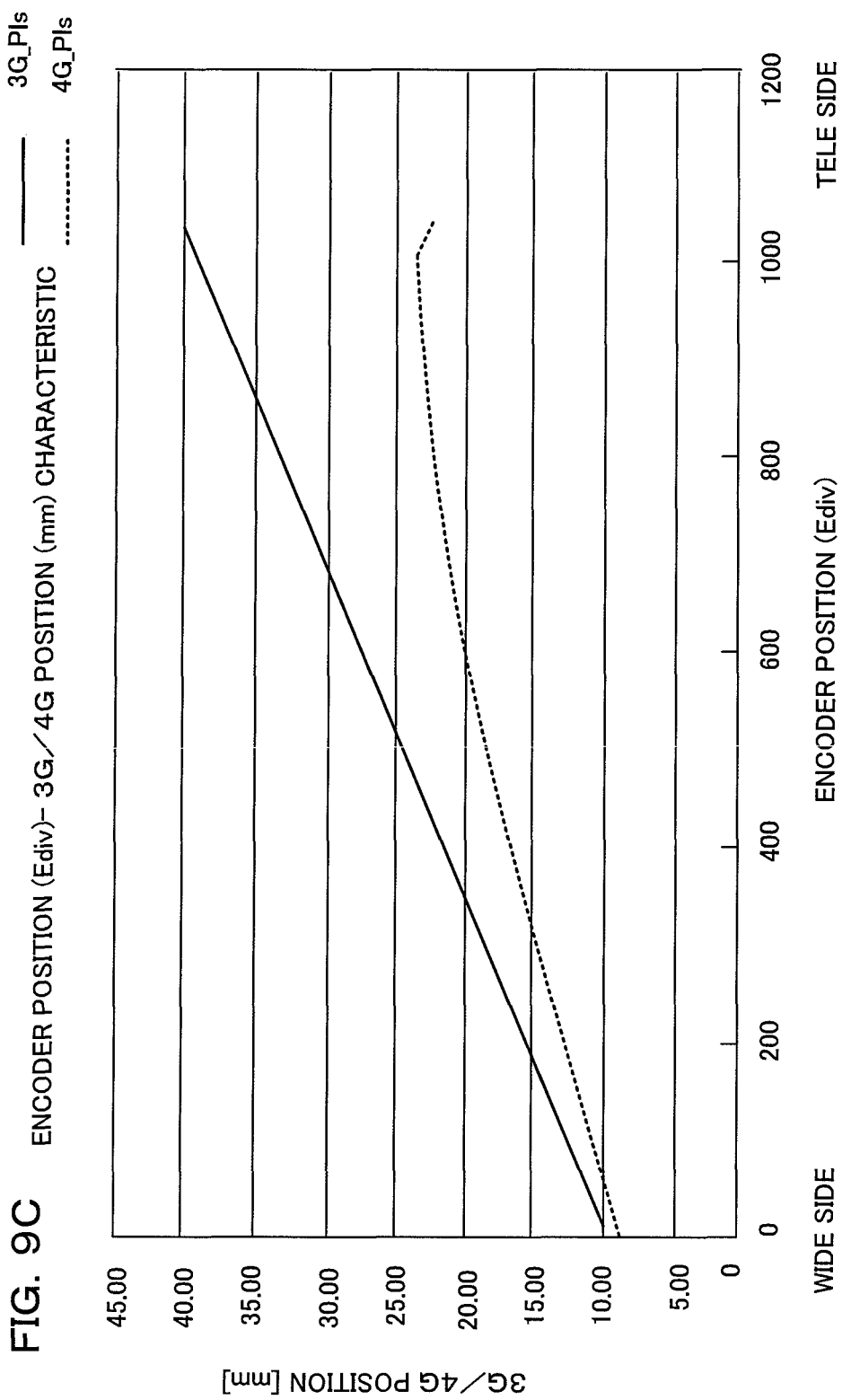
FIG. 9C is a graph showing drive trajectories of zoom groups of the interchangeable lens of one embodiment of the present invention, and shows a relationship between encoder position for a first zoom group (3G) and a second zoom group, and position of the first zoom group (3G) and the second zoom group.

FIG. 9C is a graph having the horizontal axis representing encoder position Ediv, and the vertical axis representing absolute position (mm) of 3G and 4G. This graph is practically the same as the graph of FIG. 9A, with the only difference being the units on the vertical axis. With the example shown in FIG. 9C, position of a lens mount surface etc. is made reference, and the positional relationship between 3G and 4G is shown by absolute position.

Figure 10A:
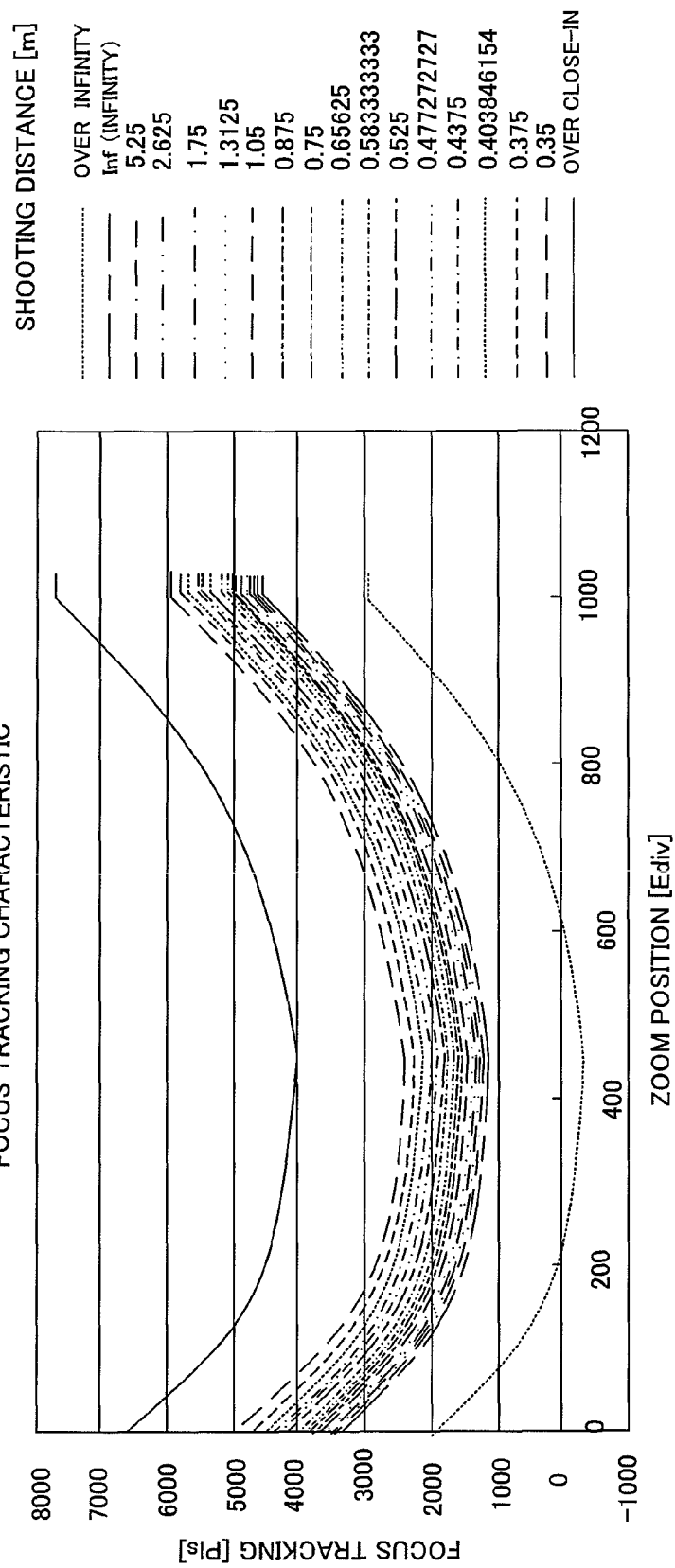
FIG. 10A is a graph showing one example of a relationship between zoom position and focus position of the interchangeable lens of one embodiment of the present invention, and shows position of a focus lens group with respect to zoom position for each focal length.

Next, a relationship between zoom position and focus position will be described using FIG. 10A and FIG. 10B. FIG. 10A shows position of the focus lens group 103 (represented by stepping motor drive pulse number Pls from a reference position of the focus lens group) on the vertical axis with respect to focal length (Ediv units in the drawing) that is shown on the horizontal axis, with position of the focus lens differing for each shooting distance. Also, a relationship between shooting distance and focus position in macro mode is shown in FIG. 10B. With this embodiment, in macro mode it is possible to set micro 1 to macro 3 having different angle of view (focal length).

Next, the spring provided between the first zoom group 105 and the second zoom group 107 will be described using FIG. 11A-FIG. 11C. As shown in FIG. 11A, a spring 351 is provided between the first zoom group (3G) 105 and the second zoom group (4G) 107, and acts to pull the first and second zoom groups 105 and 107 together.

The first zoom group (3G) 105 is capable of movement in an operating range M, and from the wide side to the telephoto side within the operating range M is divided into eight segments A-H, as shown in FIG. 11B. This eight segmented region is determined by unit Ediv of the virtual encoder representing zoom position, as shown in FIG. 11C. For example, a border between region A and region B is at the 132 Ediv position, and a border between region B and region C is at the 400 Ediv position. Position within this operating range M is detected by the 3G absolute position detection sensor 177 (linear encoder 177*a*), and converted to Ediv.

The second zoom group (4G) 107 is capable of movement in an operating range N, and as shown in FIG. FIG. 11B from the wide side to the telephoto side within the operating range N is divided into four segments 1-4. This 4 segmented region is determined by unit Ediv of the virtual encoder representing zoom position, as shown in FIG. 11C. For example, a border between region 1 and region 2 is at the 7 Ediv position, and a border between region 2 and region 3 is at the 194 Ediv position. Position within this operating range N is detected by the 4G reference position detection sensor 181 (photointerrupter PI1, photo interrupter PI2) and converted to the above-described region.

Next, maximum speed at the time of mode switching will be described using FIG. 12A, FIG. 12B, FIG. 13A and FIG. 13B. As was described previously, the first zoom group 105 and the second zoom group 107 are being pulled together by the spring 351, and so a maximum speed at which the stepping motors can drive without loss of synchronization is determined by distance between the two zoom groups, and whether drive is in the pulling direction or the opposite direction.

Figure 12A:
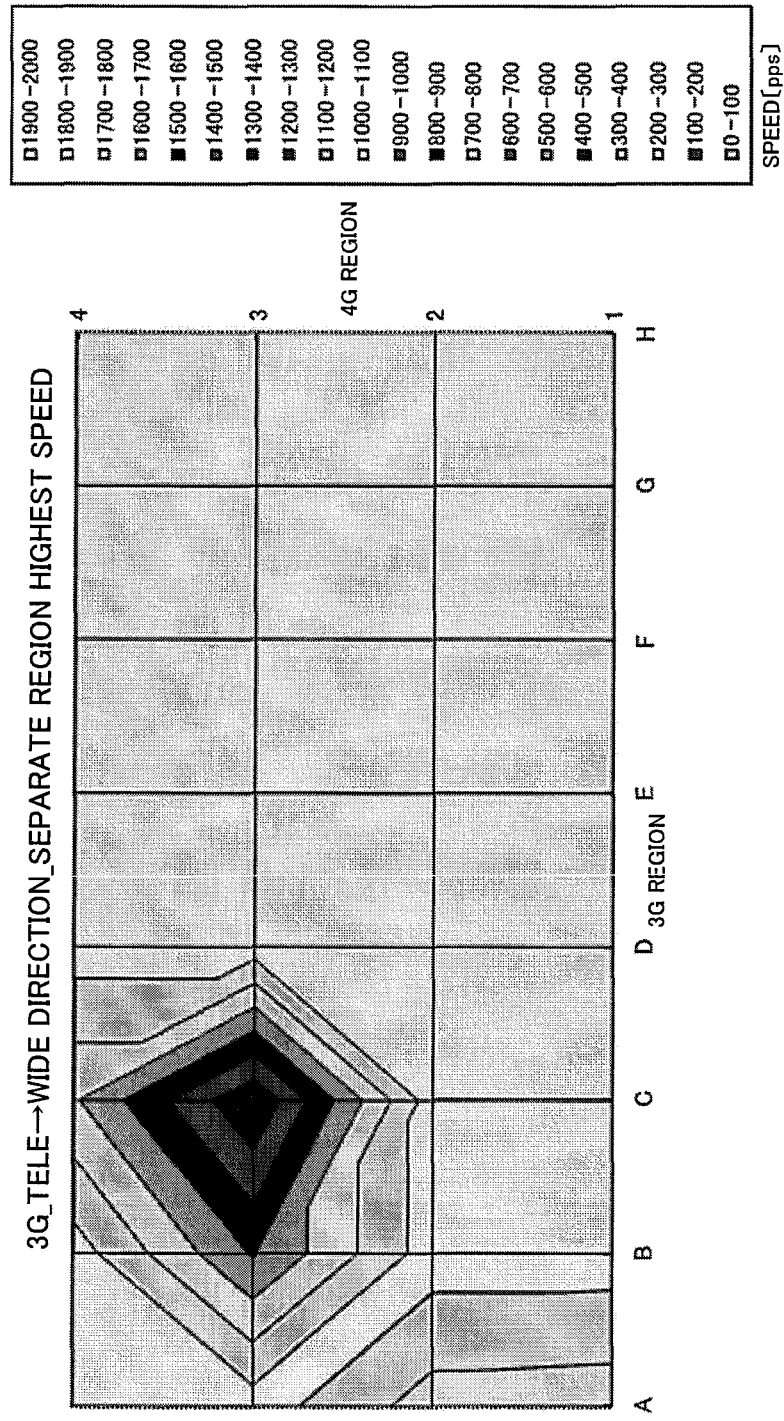
FIG. 12A is a drawing showing one example of maximum speed at the time of mode switching, with the interchangeable lens of one embodiment of the present invention, and shows one example of maximum speed of the first zoom group (3G) in the case of moving from the wide angle side to the telephoto side.
Figure 12B:
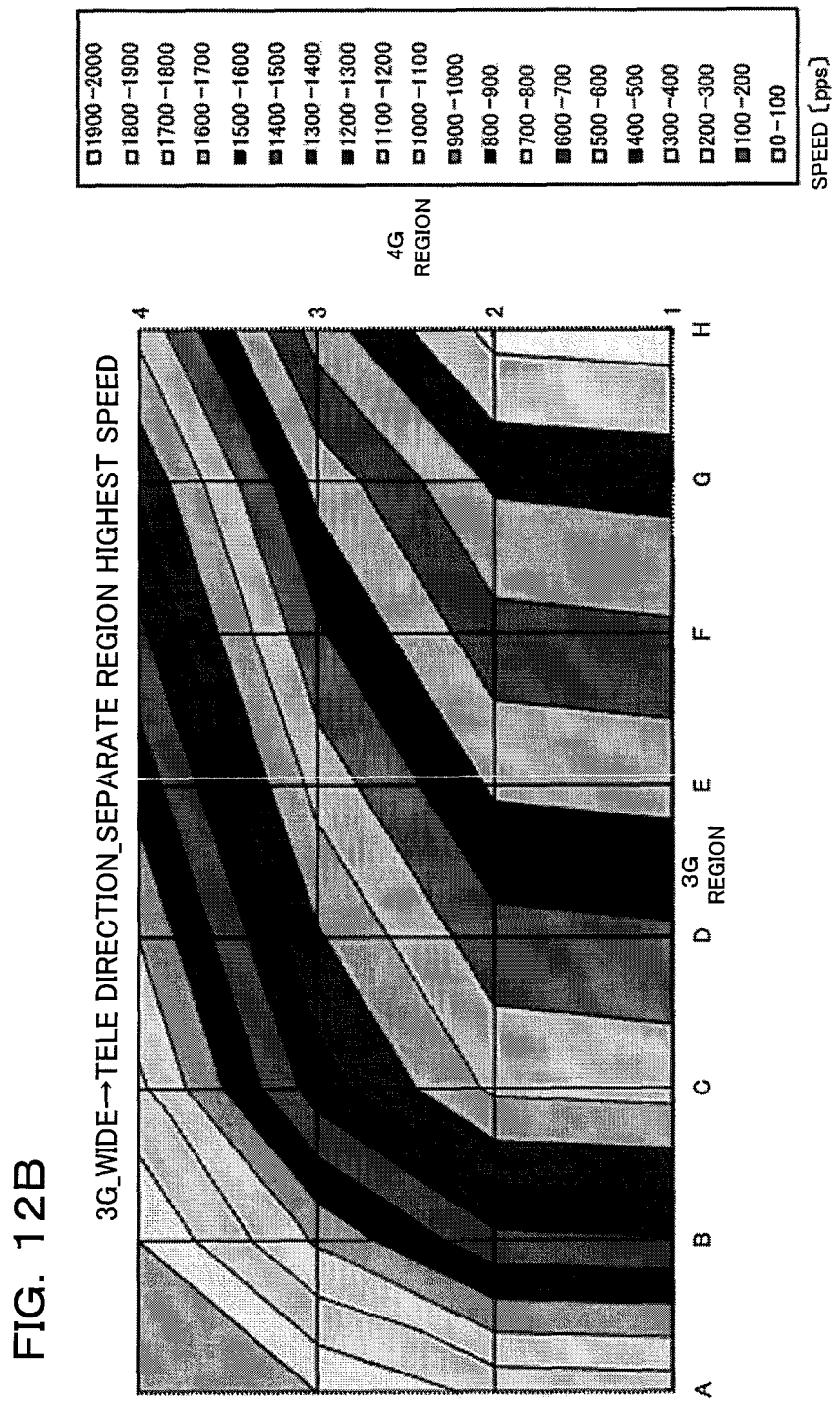
FIG. 12B is a drawing showing one example of maximum speed at the time of mode switching, with the interchangeable lens of one embodiment of the present invention, and shows maximum speed of the first zoom group (3G) in the case of moving the first zoom group (3G) from the wide angle side to the telephoto side.

FIG. 12A shows one example of maximum speed in separate regions in the case where the first zoom group (3G) 105 is driven in a direction from the telephoto end to the wide end. Here, the horizontal axis shows region (A-H) in which the first zoom group (3G) 105 exists, and the vertical axis shows region (1-4) in which the second zoom group (4G) 107 exists. FIG. 12b shows one example of maximum speed in separate regions in the case where the first zoom group (3G) 105 is driven in a direction from the wide end to the telephoto end.

Figure 13A:
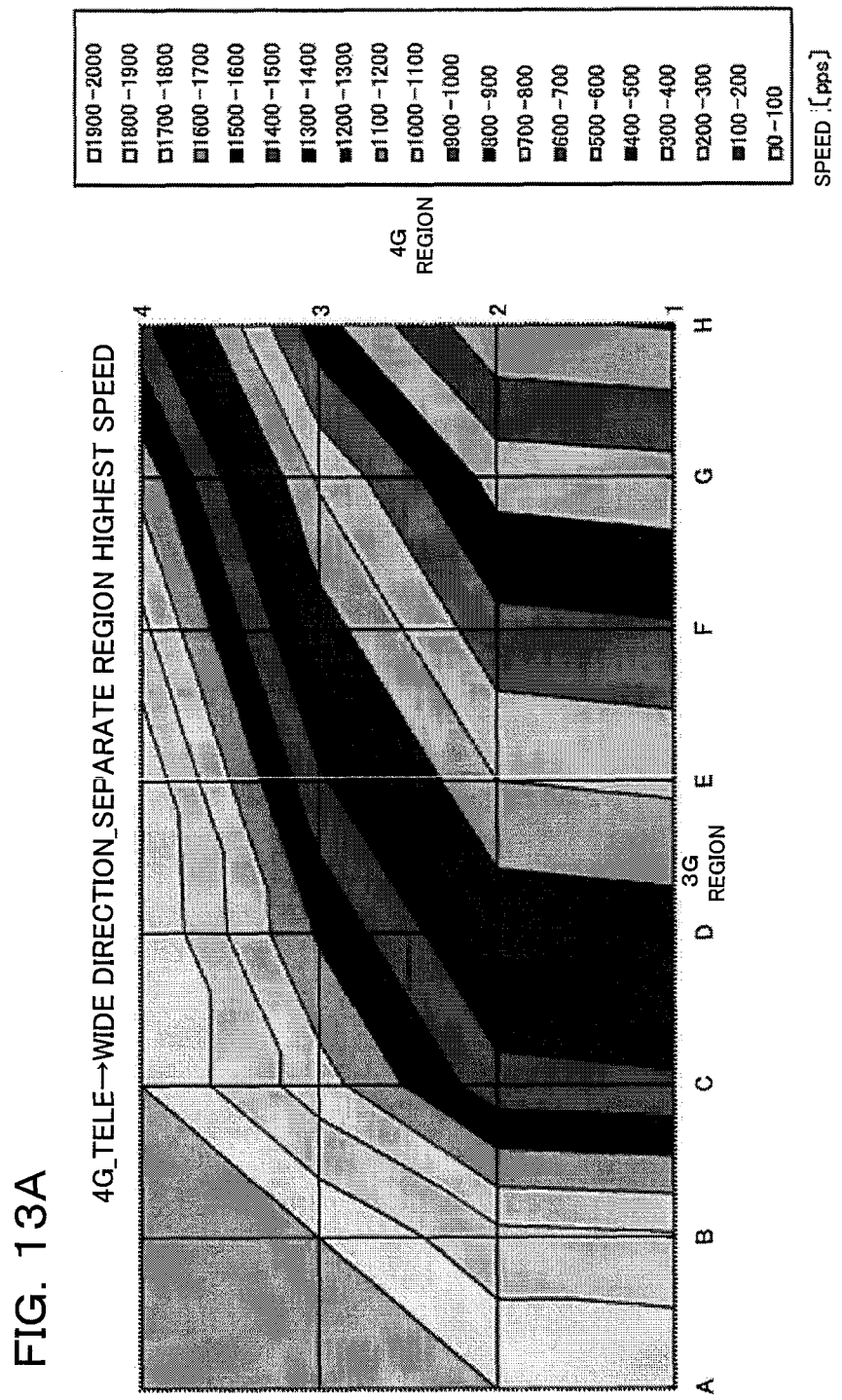
FIG. 13A is a drawing showing one example of maximum speed at the time of mode switching, with the interchangeable lens of one embodiment of the present invention, and shows maximum speed of the second zoom group (4G) in the case of moving from the wide angle side to the telephoto side.
Figure 13B:
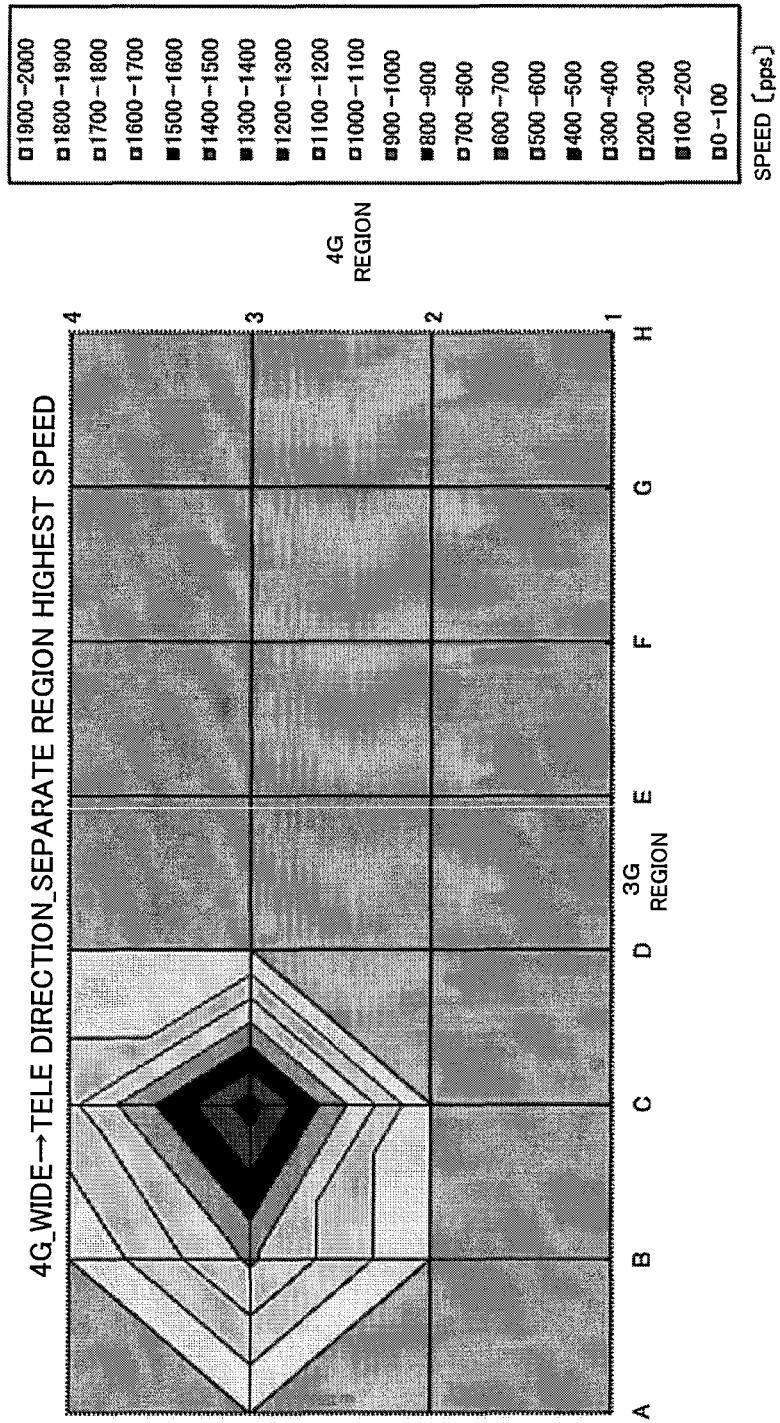
FIG. 13B is a drawing showing one example of maximum speed at the time of mode switching, with the interchangeable lens of one embodiment of the present invention, and shows maximum speed of the second zoom group (4G) in the case of moving the second zoom group (4G) from the wide angle side to the telephoto side.

FIG. 13A shows one example of maximum speed in separate regions in the case where the second zoom group (4G) 107 is driven in a direction from the telephoto end to the wide end. FIG. 13B shows one example of maximum speed in separate regions in the case where the second zoom group (4G) 107 is driven in a direction from the wide end to the telephoto end. Here also, the horizontal axis shows region (A-H) in which the first zoom group (3G) 105 exists, and the vertical axis shows region (1-4) in which the second zoom group (4G) 107 exists.

Next, acceleration and deceleration curves at the time of carrying out acceleration and deceleration will be described using FIG. 14A-FIG. 1B. With this embodiment, when electronic zoom (EZ) mode is set, if zooming is started with each lens group in a stopped state, drive of the first zoom group 105 and the second zoom group 107 is commenced, and once zooming is completed drive of the first zoom group 105 and the second zoom group 107 is stopped. An acceleration curve at the time of this drive commencement is shown in FIG. 14A, and the deceleration curve at the time of stopping drive is shown in FIG. 14B.

Figure 14A:
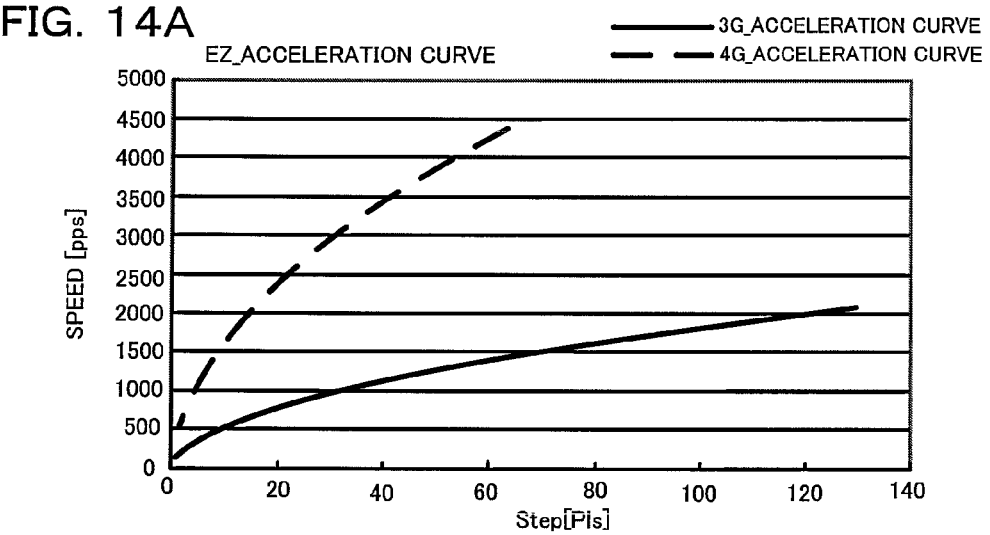
FIG. 14A and FIG. 14B are graphs showing one example of acceleration curves for stepping motors at the time of electronic zoom (EZ) mode, in the interchangeable lens of one embodiment of the present invention, with FIG. 14A being a graph showing an EZ_acceleration curve and FIG. 14B being a graph showing an EZ_deceleration curve.
Figure 14B:
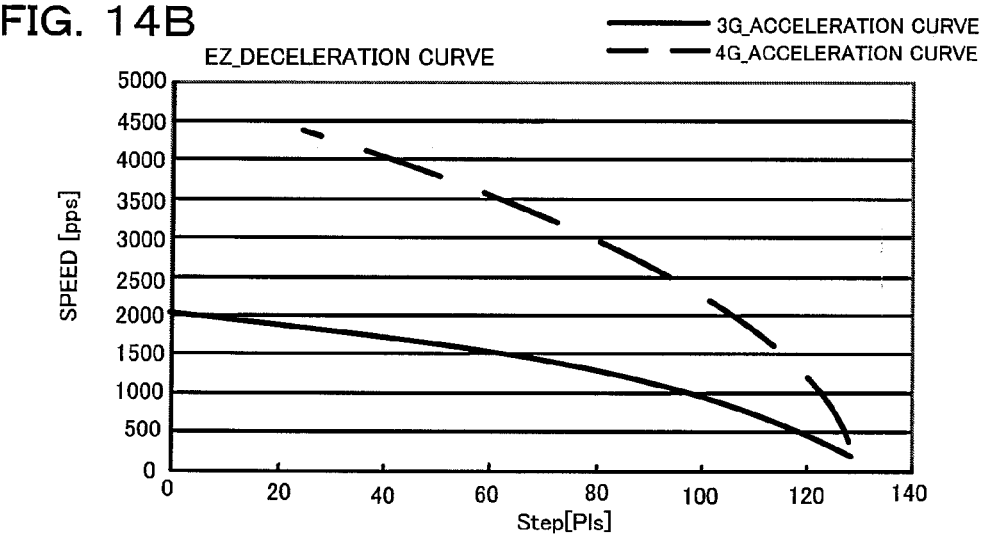

In FIG. 14A and FIG. 14B, the horizontal axis represents Pls steps of a stepping motor, and the vertical axis represents speed. As was described using FIG. 9B, during a zooming operation target speed is determined in accordance with virtual encoder position (Ediv), and if acceleration is commenced acceleration is carried out along the acceleration curve shown in FIG. 14A toward the target speed. This acceleration curve is a speed at which the stepping motor can accelerate without losing synchronization.

Also, in the case of stopping during a zooming operation at the target speed, deceleration is carried out along the deceleration curve shown in FIG. 14B, from the target speed to 0. Specifically, in order to stop at the target position deceleration is performed at the speed shown in each step. This deceleration curve is a speed at which the stepping motor can decelerate without losing synchronization.

Figure 15:
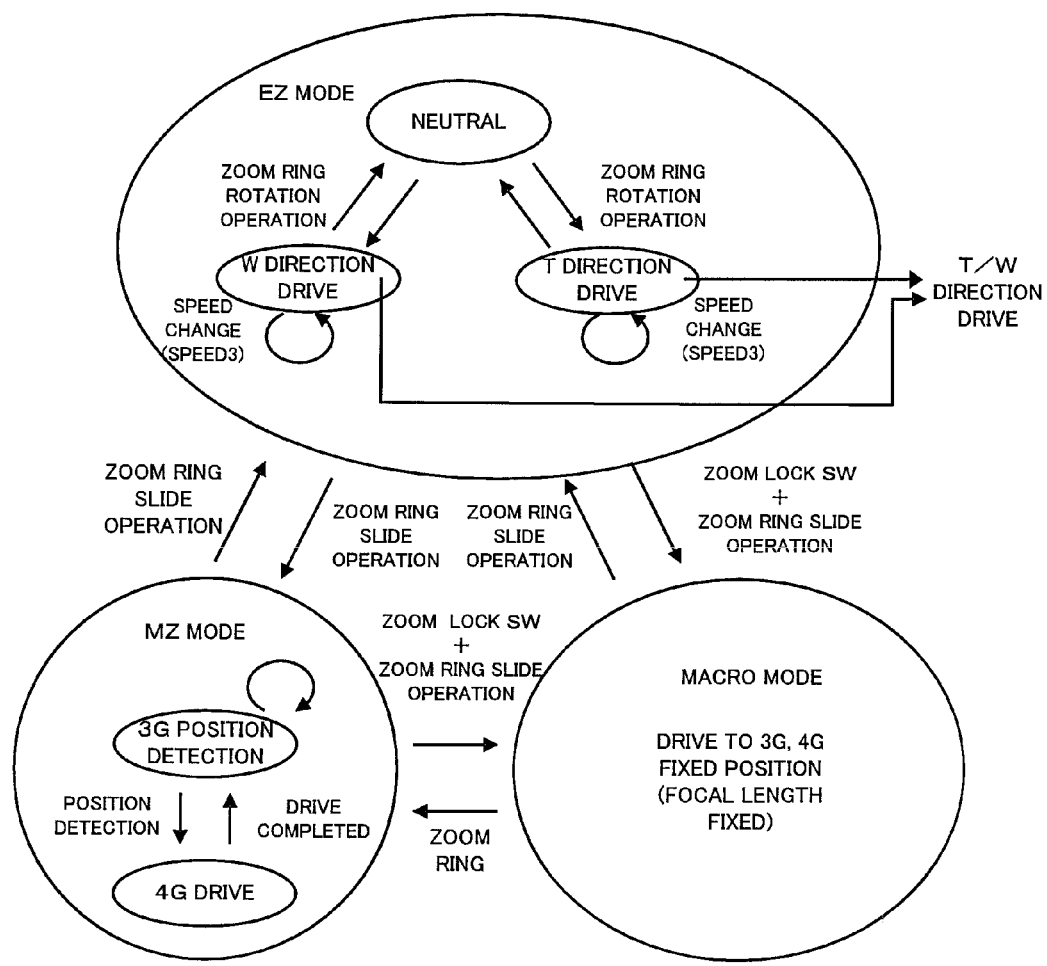
FIG. 15 is a mode switching transition diagram for the interchangeable lens of one embodiment of the present invention.

Next, mode switching of this embodiment will be described using FIG. 15. With this embodiment, as was described previously, it is possible to set electronic zoom (EZ) mode, mechanical manual zoom (MZ) mode, and macro mode. Switching between electronic zoom (EZ) mode, mechanical manual zoom (MZ) mode and macro mode can be carried out by a sliding operation of the zoom function switching operation member 143 functioning as a zoom ring. When switching from electronic zoom mode or mechanical manual zoom mode to macro mode, with this embodiment, in order to prevent erroneous operation, a sliding operation of the zoom function switching operation member 143 is carried out together with operation of the zoom lock switch 147.

When electronic zoom (EZ) mode has been set, in the case of carrying out a rotation operation of the zoom function switching operation member 143 in a neutral position where a zooming operation has not been carried out, wide direction drive or telephoto direction drive is carried out in accordance with the direction of that rotation, as was described using FIG. 6 and FIG. 7A-FIG. 7C. Also, at that time, it is possible to carry out speed change in accordance with rotation amount (rotational angle) of the zoom function switching operation member 143.

When mechanical manual zoom (MZ) mode has been set, the first zoom group 105 is manually driven in accordance with a turning operation of the zoom function switching member 143, as was described using FIG. 3. At this time, the position of the first zoom group (3G) 105 is detected by the linear encoder 177a, and the second zoom group (4G) 107 is driven to a position shown in FIG. 9(a) based on the result of this detection.

If macro mode is set, then the first zoom group (3G) 105 and the second zoom group (4G) 107 are driven to fixed positions stored in the storage section 133, as was described using FIG. 7C.

With this embodiment, a detection timing for mode etc. is every fixed time (for example 30 Hz (=33.3 ms)), and mode state is detected with the Gray code encoder that was shown in FIG. 8B. At the time of mode detection, chatter killer processing is carried out, that is, encoder output is acquired a plurality of times (for example twice), and if the same mode is detected each time, that mode detection is fixed.

Figure 16A:
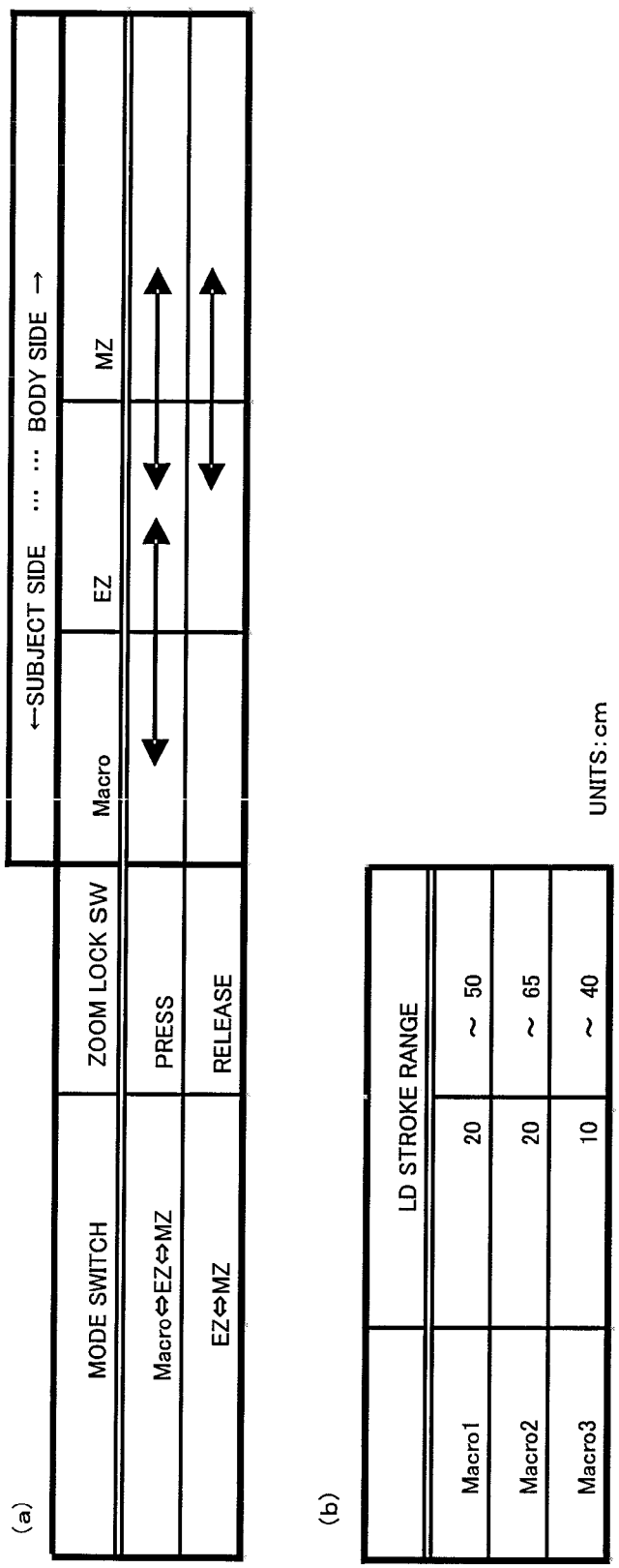
FIG. 16A is a drawing for describing mode switching, in the interchangeable lens of one embodiment of the present invention, with table (a) showing a relationship between a zoom lock switch and mode switching, and table (b) showing one example of drive range of a focus lens group in the case of macro modes 1-3.

Also, in the case where a zoom lock SW at the time of mode switching is switched from macro mode to electronic zoom (EZ) mode or mechanical manual zoom (MZ) mode, as shown in table (a) of FIG. 16A, or conversely switched from electronic zoom (EZ) mode or mechanical manual zoom (MZ) mode to macro mode, without the zoom lock switch 147 being pressed down, switching of mode can not be carried out. However, it is possible to carry out mode switching during electronic zoom (EZ) mode and mechanical manual zoom (MZ) mode, even with the zoom lock switch 147 released.

It is possible to only have one type of macro mode, but with this embodiment 3 macro modes are provided, macro 1-macro 3, as was shown FIG. 10B. As described above, the first zoom group 105 and the second zoom group 107 are driven to predetermined fixed positions. One example of shooting range of the focus lens group 103 at this time is shown in table (b) of FIG. 16A. With this example, shooting range is 20 to 50 cm with macro 1, 20 to 65 cm with macro 1, and 10 to 40 cm with macro 3, and the focus lens group 103 is driven so as to focus in this range.

With this embodiment, since there are three modes, namely electronic zoom (EZ) mode, mechanical manual zoom (MZ) mode, and macro mode, there are six mode transitions, as shown in FIG. 16B. FIG. 16B shows lens operation at the time of each mode transition, and focus position for each of macro 1-macro 3.

If mode transition is carried out, there is a possibility of inaccuracy in positional control of the first zoom group 105, and so refresh is carried out. If refresh of positional control of the first zoom group (3G) 105 becomes necessary as a result of carrying out a mode transition, a refresh required flag is prepared for determining refresh completed/not executed. Positional control of the first zoom group (3G) 105 is carried out by counting drive pulses Pls of a stepping motor, with absolute position from the linear encoder 177a as a reference.

In the event that the refresh required flag is set, 3G initial drive processing is carried out. The Pls position on the linear encoder position are made coincident by the 3G initial drive. Specifically, output of the linear encoder 177a is read out while driving the first zoom group 3G, and once the output reaches a specified value the 3G position at that time is subjected to predetermined adjustment and made Pls position that is stored. Once processing including the 3G initial drive is completed, the refresh required flag is cleared.

On the other hand, the second zoom group (4G) 107 is not directly driven by the user's zoom ring operation. It is therefore not necessary to carry out reference position output with initial drive of the second zoom group 107 at the time of mode switching.

In the event that mode transition for MZ→EZ/MZ→macro has been detected at the mode detection update timing, the refresh required flag is set as a result of the mode transition. With mode transition, in the event that another mode is detected during processing after transition, processing is terminated. The refresh required flag is used in determining whether or not processing including 3G initial drive has been completed. Specific details of the above-described operations will be described later based on the flowchart of FIG. 23. In a state where refresh is required, since there may be situations where the user operates the zoom ring causing interrupt handling to occur, and the refresh processing to be interrupted, the refresh required flag is provided to simplify determination of the refresh required state.

Next, individual processing associated with mode change will be described.

(Macro→Electronic Zoom (EZ))

In the case where mode has changed from macro mode to electronic zoom (EZ) mode, refresh for the first zoom group (3G) 105 is not required. This is because during macro mode, positions of the first zoom group 105 and the second zoom group (4G) 107 are fixed, and there is no need for refresh. If there is a switch from macro mode to electronic zoom mode, the first and second zoom groups 105 and 107 are driven to an electronic zoom (EZ) position that gives the same angle of view as macro. Ediv at the time of electronic zoom that gives the same angle of view as macro mode is stored in the storage section 133. Also drive position LD of the focus lens group 103 is made a position that is furthest to the infinity side in the distance range for which shooting is possible at the time of macro mode.

For example, shooting range LD in the case of normal mode is 25 cm to ∞, but with macro mode, the range in which shooting is possible for the case of macro 1, for example, is 20 to 50 cm, and these two shooting ranges are not coincident. In this type of situation, a position that is furthest to the infinity side in the range in which shooting is possible for macro mode is made 50 cm. As was described previously, with this embodiment, there are three macro modes, macro 1-macro 3, and drive ranges (LD stroke range), which are respective ranges in which photography is possible, are the same as the ranges shown in table (b) of FIG. 16A.

(Electronic Zoom (EZ)→Macro)

In the case where mode has changed from electronic zoom (EZ) to macro, refresh for the first zoom group (3G) 105 is not required. If macro mode is switch to, positions of the first zoom group 105 and the second zoom group 107 are fixed at positions corresponding to the macro mode, which means there is no need for refresh. If there is a switch from electronic zoom mode to macro mode, the first zoom group 105 and the second zoom group 107 are driven to positions for the time of macro that were instructed in macro control data.

Drive position (LD position) of the focus lens group 103 is moved to the infinity side position. For example, if a range in which photography is possible at the time of macro is a drive stroke of 20 cm to 50 cm, the focus lens group 103 is driven to the 50 cm LD position. Since distance to the subject is unclear before carrying out focus detection drive is carried out to and LD position that gives a greater depth of field.

(Electronic Zoom (EZ)→Mechanical Manual Zoom (MZ))

In the case where there has been a mode change from electronic zoom (EZ) to mechanical manual zoom (MZ), a linear encoder position is acquired from the linear encoder 177a indicating absolute position of the first zoom group (3G) 105, and Ediv position is obtained and converted to Pls position. Once position of the first zoom group (3G) is known, the second zoom group (4G) 107 is next moved to a position corresponding to the position of the first zoom group (3G).

In this case, the lens position (LD position) of the focus lens group 103 is kept at its position. This is only for switching of mode, and since zoom position is not changed it is not necessary to change the lens position (LD position) of the focus lens either. If a mechanical manual zoom state is entered after completion of mode change, an LD tracking operation is commenced, and if zoom position is changed after this LD position is changed in accordance with the zoom position. With the lens configuration of this embodiment, in the case where the position of the focus lens group 103 is fixed, the distance to a subject to be focused on is changed by zoom operation. The LD tracking operation is an operation to drive the focus lens group 103 to an LD position corresponding to subject distance at which to focus in response to a zoom operation, so as to maintain subject distance being focused on before the zoom operation. The LD tracking operation is executed based on the focus tracking characteristic of FIG. 10A.

(Mechanical Manual Zoom (MZ)→Electronic Zoom (EZ))

In the case of a mode change from mechanical manual zoom (MZ) mode to electronic zoom (EZ), refresh for the first zoom group (3G) 105 becomes necessary. This is because in mechanical manual zoom mode the first zoom group (3G) 105 is directly driven manually by the user, and it is necessary to make the linear encoder position and the Pls position coincide. Accordingly, if there is a switch from mechanical manual zoom mode to electronic zoom mode, the refresh required flag is set, 3G initial drive is carried out, and the encoder position and the Pls position are made to coincide. Once 3G initial drive is completed, the refresh required flag is cleared.

The first and second zoom groups 105 and 107 are driven to the same positions as before mode switching. However, in the event that the positions of the first and second zoom groups 105 on 107 for mechanical manual zoom are outside the range of from the wide end EZWide to the telephoto end EZTele for electronic zoom, the first and second zoom groups are driven to an EZ position (EZWide or EZTele) after mode change. The lens position (LD position) of the focus lens group 103 is kept at its current LD position. Then, after transition to electronic zoom mode, an LD tracking operation is commenced.

(Macro→Mechanical Manual Zoom (MZ))

In the case where there has been a change from macro mode to mechanical manual zoom, similar processing to the above-described transition from macro mode to electronic zoom is carried out, and so detailed description will be omitted.

(Mechanical Manual Zoom (MZ)→Macro)

In the case of a mode change from mechanical manual zoom (MZ) mode to macro, refresh for the first zoom group (3G) 105 becomes necessary. Similarly to the case where there has been a switch from mechanical manual zoom mode to electronic zoom, the refresh required flag is set, 3G initial drive is carried out, and the encoder position and the Pls position are made to coincide. Once 3G initial drive is completed, the refresh required flag is cleared. Lens position (LD position) of the focus lens group 103 is driven to the most infinity side position of the drive stroke for macro 1, which is 50 cm. Also, in the case of macro 2 and macro 3, the LD position is driven to the position furthest to the infinity side, which is 65 cm or 45 cm respectively.

There may be instances where mode change is performed during execution of the above-described mode change processing. Processing in this type of situation will be described in the following.

(When Mode Change Arises Between Macromode and Electronic Zoom)

If macro processing is being executed, processing is executed until the macro processing sequence is completed, mode after completion is then detected, and if it has become electronic zoom mode, electronic zoom mode processing is executed. Also, if electronic zoom processing is being executed, processing is executed until the electronic zoom processing sequence is completed, mode after completion is then detected, and if it has become macro mode, macro mode processing is executed.

(When Mode Change Arises Between Electronic Zoom, Macro and Mechanical Manual Zoom)

In the event that a mode change to mechanical manual zoom has been detected during processing execution for electronic zoom or macro, drive of the first zoom group (3G) 105 it stopped. The second zoom group (4G) 107 is driven to the Ediv position constituting a synchronous position to the stopped first zoom group (3G) 105. Also, if mechanical manual zoom processing is being executed, processing is executed until completion of the mechanical manual zoom processing sequence, mode after completion is detected, and if the mode has become electronic zoom or macro mode, processing for electronic zoom or macro mode is executed.

Next, macro control data (parameters) used in macro control will be described using FIG. 17A-FIG. 17C. Numbers shown in FIG. 17A-FIG. 17C are only examples. FIG. 17A shows zoom position of the first zoom group (3G) 105 and the second zoom group (4G) 107 at the time of macro mode setting, in Ediv units. With the illustrated example, the 3G position is 890 Ediv, and the 4G position is 668 Ediv. Also, if there are a plurality of macro positions (macro 1 to macro 3) a plurality of combination tables will be held.

FIG. 17B shows zoom position at the time of macro completion (macro field of view position) in Ediv units. This position is the Ediv position when 3G and 4G are driven at the time that macro mode is completed and there is a change to EZ mode. If there are a plurality of macro positions (macro 1 to macro 3) a plurality of combination tables will be held. Zoom position at the time of macro completion (macro field of view position) is made zoom position at the time of EZ zoom mode that gives the same field of view as the field of view at the time of macro mode. In the case of changing from macro mode to EZ mode, fluctuation in angle of view can be kept as small as possible by changing from the macro position to the macro field of view position, so that the photographer does not have any feeling of discomfort.

FIG. 17C shows lens position (LD position) of the focus lens group 103 at the time of macro completion, in Pls units. If there are a plurality of macro positions (macro 1 to macro 3) a plurality of combination tables will be held. This lens position corresponds to subject distance of 50 cm, 65 cm, or 40 cm, which is the position closest to the infinity end for each of macro 1-macro 3, respectively.

Figure 18:
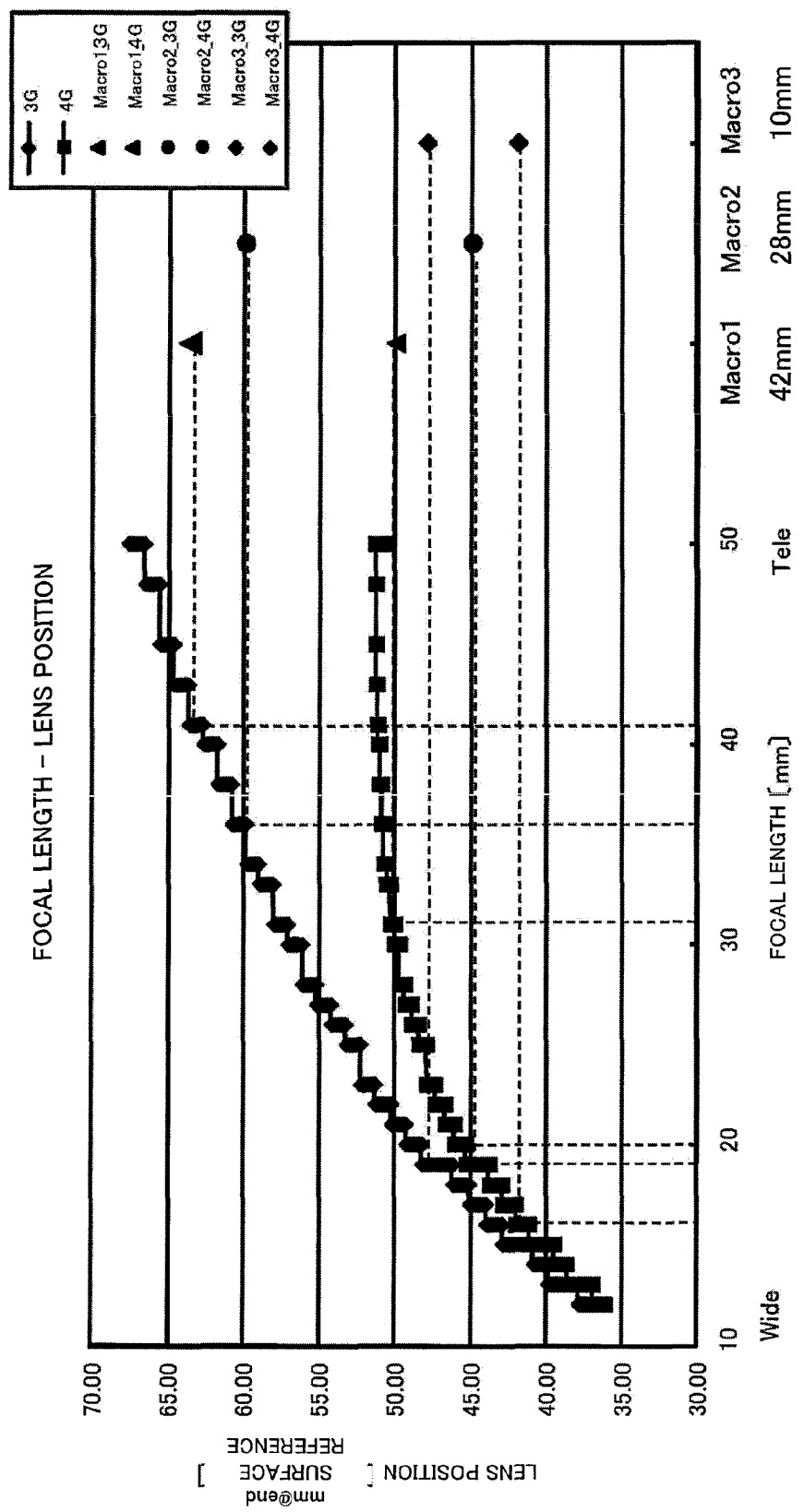
FIG. 18 is a graph showing one example of zoom group drive trajectories and macro position relationships for the interchangeable lens of one embodiment of the present invention.

FIG. 18 shows an example of the relationship between drive trajectory of the zoom groups and macro position. In the graph of FIG. 18, trajectories of 3G and 4G on the left side show relationship between 3G and 4G lens position and each focal length used in normal electronic zoom and normal mechanical manual zoom. Each of the points shown on the right side of this trajectory are lens positions for 3G and 4G in macro modes. Magnification factor and field of view for the macro modes are determined by combination of 3G and 4G points used at the time of zoom and combination of other points. There are a plurality of such points (with this embodiment, three points for macro 1 to macro 3).

With macro 1 to macro 3, 3G and 4G positions differ from normal zoom state positions, and optical design is carried out in advance so as to configure an optical state with higher-shooting magnification, and also so as to maintain optical image quality, such as aberration in this optical state. With this example, macro 1 corresponds to so-called standard macro, and macro 3 corresponds to so-called wide angle macro. Also, by making focal length at the telephoto side of the interchangeable lens more towards the telephoto side (for example a focal length of 200 mm), it is possible to use macro 1 for shooting as so-called telephoto macro, and to use macro 2 as so-called mid-telephoto macro.

As a method of switching in the case where there are a plurality of macro positions, there are methods such as that described below.

Example 1

Switching of a plurality of macro positions 1-3 is carried out by setting the zoom ring (zoom function switching operation member 143) to the macro mode position, and then rotating the zoom ring (zoom function switching operation member 143) at this macro mode position. In this case, position is confirmed by pressing the function button 145 at the position where the macro position has been switched to. Position may also be confirmed by releasing the function button 145.

Example 2

The zoom ring is moved to the macro mode position and switching is sequentially carried out in the order macro 1→macro 2→macro 2 . . . by pressing the function button 145 at this position.

FIG. 19 shows division of regions of a virtual zoom encoder. With this embodiment, an Ediv region is divided into 128, and set as a zoom encoder, with the final three of these 128 divisions, namely regions where ZMENC=125-127, being allocated to macro use. In this way, it is made possible to connect to a non-compliant camera body in macro mode. As was described previously, with this embodiment a virtual encoder is divided into from 1-1024 in Ediv units. As shown in the zoom encoder values (ZMENC value) of FIG. 19, finely divided zoom encoder values are defined for each section, into 1-127 throughout the region, and this value is made an encoder value that is transmitted from the interchangeable lens 100 to the camera body 200. With this embodiment, there are 128 divisions, but this number of divisions is not limiting and it is also possible, for example, to have another number of divisions such as 32 divisions or 256 divisions.

With the relationship diagram shown in FIG. 19, the final three of the 128 divisions are allocated to macro positions, and this position becomes a focal length of 42 mm, 28 mm, or 10 mm respectively, corresponding to macro 1 to macro 3. Lens internal data associated with an encoder value is transmitted from the interchangeable lens 100 to the camera body 200, and data of the 125th to 127th divisions of the encoder is transmitted from the interchangeable lens 100 to the camera body 200 as predetermined macro data. It is then possible to carry out appropriate correction in accordance with macro 1 to macro 3 by using this lens internal data.

As lens internal data transmitted from the interchangeable lens 100 to the camera body 200, there are, for example, macro focal length information, shading correction information, vibration correction information, distortion correction information, and aperture step and F No. correspondence information.

Next, power supply on and off switching and mode switching of the interchangeable lens 100 will be described. A power supply button, not illustrated, is provided on the camera body 200. If this power supply button is operated to turn the power supply on, a reset drive instruction for power supply turn on is transmitted via a body IF 151 from the camera body 200 to the interchangeable lens 100.

As the reset drive instruction, it is possible to set two types of instruction, namely a parameter instruction for setting to the same zoom when powering on as the position that was set at the time of powering off, and arbitrary initialization to set an arbitrary zoom position held by the interchangeable lens 100. This setting is carried out on a menu screen etc. of the camera body 200. Depending on the setting, a SetInitAct command is transmitted from the camera body 200 to the interchangeable lens 100, and either the parameter instruction or arbitrary initialization is set.

Also, in the case where the power supply button on the camera body 200 has been operated to turn the power supply off, a LensStop2 command is transmitted from the camera body 200 to the interchangeable lens 100, and a zoom position at the time of power off is transmitted from the interchangeable lens 100 to the camera body 200. This returned zoom position at the time of power off is stored in a storage section within the camera body 200. In the case where the above-described parameter instruction has been set, the stored zoom position at the time of power off is instructed using a parameter instruction command at the time of power off.

By operating an interchangeable lens detachment button, not illustrated, that is provided on the camera body 200, it is possible to detach the interchangeable lens 100 from the camera body 200. In this case, power supply of the interchangeable lens 100 is turned off forcibly, and so the operation to transmit the LensStop2 command from the camera body 200 to the interchangeable lens 100, and return zoom position at the time of power off from the interchangeable lens 100 to the camera body 200, as described above, can not be carried out. In this type of situation, the next time the power supply is turned on, a zoom position is set by arbitrary initialization to set to an arbitrary zoom position held by the interchangeable lens 100.

As has been described above, mode of the interchangeable lens 100 is switched at the time of turning power on or off, and next the drive position of the interchangeable lens for each mode will be described using FIG. 20.

First, in the case where electronic zoom (EZ) has been set as the zoom mode of the interchangeable lens 100, if there has been a reset drive instruction from the camera body 100 at the time of power off the interchangeable lens 100 drives to the wide end, as an optimum EZ reset position. On the other hand, if there is no reset drive command at the time of power off, drive is performed to the optimum EZ reset position. There are a plurality of optimum EZ reset positions depending on zoom position, and, for example, when zoom position is at the wide side the optimum EZ reset position is made the wide end, if the zoom position is at the tele end the optimum EZ reset position is made the tele end, and if the zoom position is at an intermediate position an intermediate position (standard) is made the optimum EZ reset position. At the time of zooming for a LensStop2 instruction when powering off, information on final zoom position at the time of electronic zoom or on the wide end position is transmitted from the interchangeable lens 100 to the camera body 200 as zoom encoder value ZMENC.

After powering off with electronic zoom (EZ), then at the time of starting up the camera body 200 by turning on power, if the interchangeable lens 100 has been set to electronic zoom (EZ), in the event that the camera body 200 is set with a parameter instruction drive is carried out to the final zoom position at the time of powering off electronic zoom, while if there is arbitrary initialization drive is performed to the wide end. Also, in the case where the interchangeable lens 100 has been set to mechanical manual zoom (MZ) at the time of start-up, zoom drive is not carried out, even if parameter instruction or arbitrary initialization have been set. In the case where the interchangeable lens 100 has been set to macro at the time of start-up, drive is performed to the macro position, even if parameter instruction or arbitrary initialization have been set.

Next, in the case where mechanical manual zoom (MZ) has been set in the interchangeable lens 100 as the zoom mode at the time of turning the power supply off, the interchangeable lens 100 is subjected to reset drive, regardless of whether or not there is a reset drive instruction from the camera body 100. At the time of a LensStop2 instruction when powering off, information on final zoom position at the time of electronic zoom or wide position information is transmitted from the interchangeable lens 100 to the camera body 200 as zoom encoder value ZMENC.

After powering off with mechanical manual zoom (MZ), then at the time of starting up the camera body 200 by turning on power, if the interchangeable lens 100 has been set to electronic zoom (EZ), in the event that the camera body 200 receives a parameter instruction drive is carried out to the final zoom position at the time of powering off mechanical manual zoom, while if there is arbitrary initialization drive is performed to the wide end. Also, in the case where the interchangeable lens 100 has been set to mechanical manual zoom (MZ) at the time of start-up when power has been turned on, zoom drive is not carried out, even if parameter instruction or arbitrary initialization have been set. In the case where the interchangeable lens 100 has been set to macro at the time of start-up, drive is performed to the macro position, even if parameter instruction or arbitrary initialization have been set.

Next, in the case where macro has been set as the zoom mode of the interchangeable lens 100 at the time of turning off power, if there has been a reset drive instruction from the camera body 100, the interchangeable lens 100 drives to an optimum macro reset position. In the case where there has been no reset drive instruction also, similarly, drive is performed to an optimum macro reset position. At the time of the LensStop2 instruction, a 128 segmented final value for ZMENC value is transmitted from the interchangeable lens 100 to the camera body 200.

When turning on the camera body 200, after powering off with the interchangeable lens 100 in macro mode, if the interchangeable lens 100 is set to electronic zoom (EZ) and the camera body 200 has a parameter instruction, drive is performed to the same angle of view position as for macro at the time of power off in macro mode (position that gives the same angle of view as for macro). On the other hand, in the case of arbitrary initialization there is drive to the wide end. Also, in the case where the interchangeable lens 100 has been set to mechanical manual zoom (MZ) at the time of powering on, lens drive is not carried out, even if parameter instruction or arbitrary initialization have been set. In the case where the interchangeable lens 100 has been set to macro at the time of power on, drive is performed to the macro position, even if parameter instruction or arbitrary initialization have been set.

Next, operation of the one embodiment of the present invention will be described using the flowcharts shown in FIG. 21 to FIG. 28. This processing flow is executed by the CPU of the control section 131 in accordance with programs stored in the storage section 133 within the interchangeable lens 100.

Figure 21:
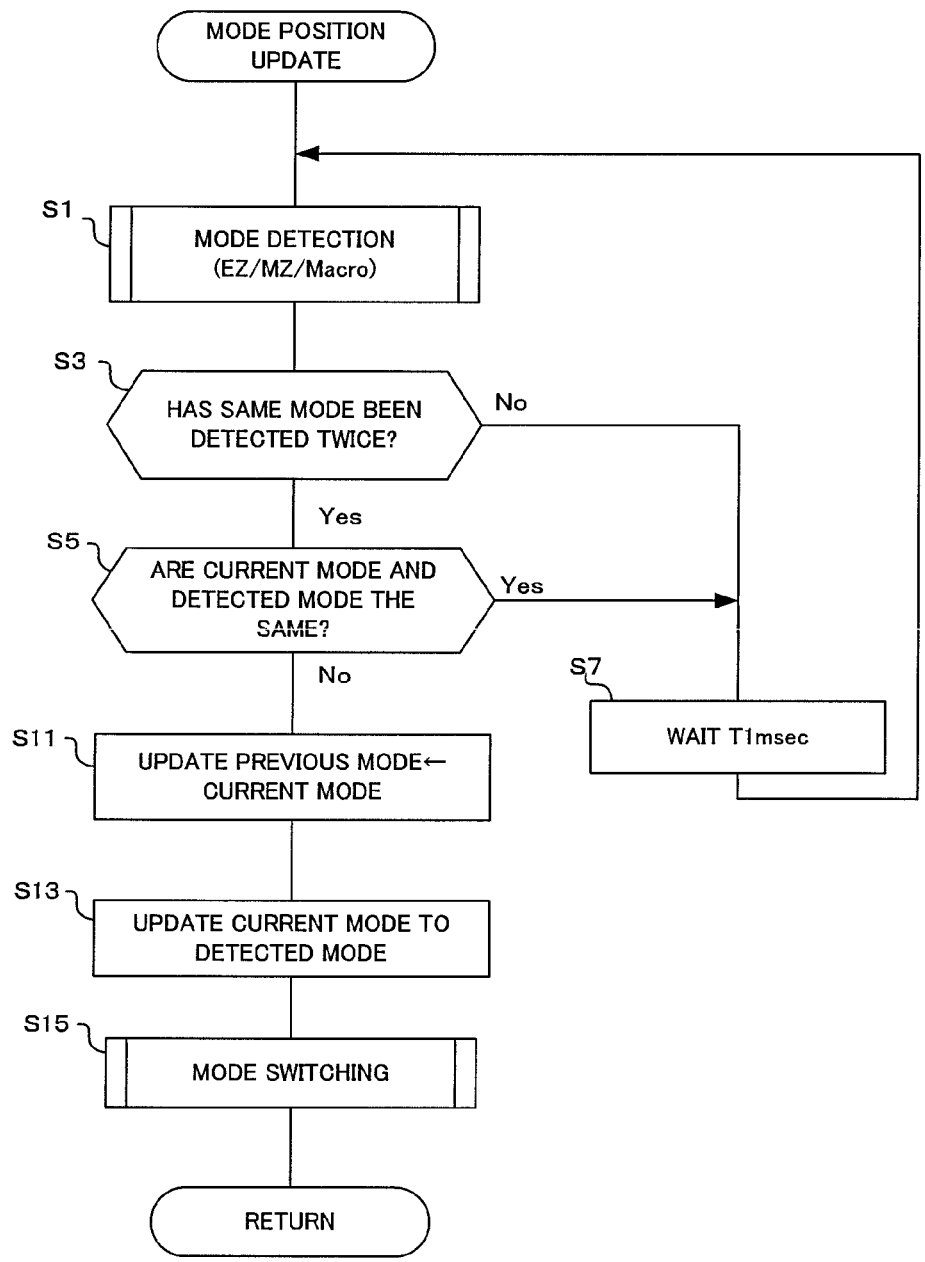
FIG. 21 is a flowchart showing operation of mode position update, in the interchangeable lens of one embodiment of the present invention.

In the main flow within the interchangeable lens 100, in the case where update of the mode shown in FIG. 21 is carried out, mode detection is first carried out (S1). Here, which of the electronic zoom (EZ) mode, mechanical manual zoom (MZ) mode or macro mode has been set is detected by the encoder of the EZ/MZ switching mechanism 169 (refer to FIG. 8A-FIG. 8D). Detailed operation of this mode detection will be described later using FIG. 22.

Once mode detection has been carried out, it is next determined whether or not the same mode has been detected twice (S3). This is in order to prevent erroneous operation due to chattering. If the result of this determination is that the same mode has been detected twice consecutively, it is next determined whether or not the current mode and the detected mode are the same (S3). Here, it is determined whether or not mode has been switched.

If the result of determination in step S3 was not that the same mode has been detected twice, or if the current mode is the same as the detected mode, a wait state is entered until time T1 seconds elapses. Once time T1 has elapsed, step S1 is returned to and mode detection is carried out again.

On the other hand, if the result of determination in step S5 was that the current mode and the detected mode are different, next the previous mode is updated to the current mode (S11), and the current mode is updated to the detected mode (S13).

Once update of the previous mode and the current mode has been carried out, mode switching is carried out next (S15). Here, as was described using FIG. 16B, processing is executed in accordance with switching of the individual modes, between electronic zoom (EZ), mechanical manual zoom (MZ) and macro mode. Detailed operation of this mode switching will be described later using FIG. 23. Once mode switching has been carried out, the originating processing flow is returned to.

Figure 22:
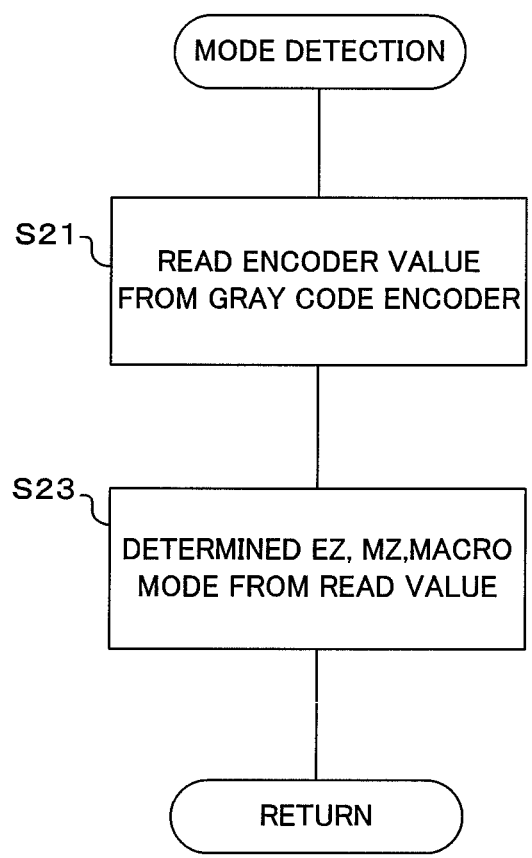
FIG. 22 is a flowchart showing operation of mode detection, in the interchangeable lens of one embodiment of the present invention.

Next, operation of the mode detection of step S1 (refer to FIG. 21) will be described using FIG. 22. If the flow for mode detection is entered, first of all an encoder value is read from the Gray code encoder (S21). Here, the control section 131 reads an encoder value from the Gray code encoder (refer to FIG. 8A-FIG. 8D) within the EZ/MZ switching detection mechanism 169.

Once the encoder value has been read, is determined from the read encoder value which of the electronic zoom (EZ) mode, mechanical manual zoom mode (MZ) or macro mode is set (S23). Once the mode has been determined the originating processing flow is returned to.

Figure 23:
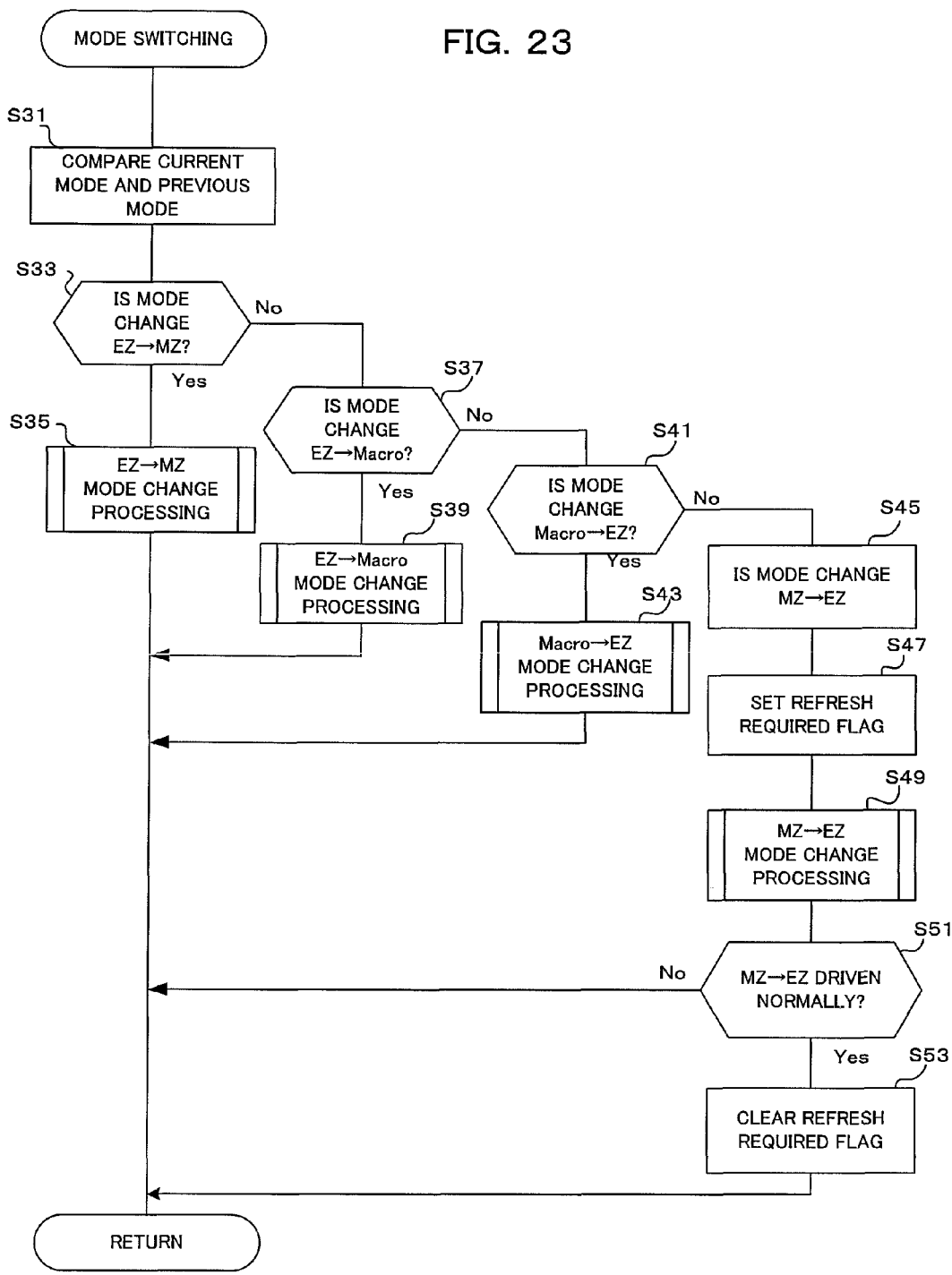
FIG. 23 is a flowchart showing a mode switching operation, in the interchangeable lens of one embodiment of the present invention.

Next, operation of the mode switching of step S15 (refer to FIG. 21) will be described using FIG. 23. If the flow for mode switching is entered, first of all the current mode and the previous mode are compared (S31). The previous mode and current mode were updated in step S11 and S13 (refer to FIG. 21), and the updated previous mode and current mode are compared Once comparison of the current mode and the previous mode has been performed, it is determined whether or not a mode change is a change from electronic zoom (EZ) to mechanical manual zoom mode (EZ) (S33). If the result of this determination is that mode change is from EZ to MZ, EZ→MZ mode change processing is carried out (S35). Mode change processing from electronic zoom mode to mechanical manual zoom mode is carried out. Specifically, there is movement to position of the second zoom group (4G) 107 corresponding to the position of the first zoom group (3G) 105. Also, since it is simply a mode change from EZ to MZ, the position of the focus lens group 103 is kept as it is without being moved. Detailed operation of this EZ→MZ mode change processing will be described later using FIG. 24.

If the result of determination in step S33 was not that there was a mode change from EZ to MZ, it is next determined whether or not the mode change is a change from electronic zoom (EZ) to macro (S37). If the result of this determination is there is mode change from EZ to macro, EZ→macro mode change processing is carried out (S39). Here, refresh for the first zoom group (3G) 105 (3G initial drive) is not required, and the first and second zoom groups 105 and 107 are driven to the macro position that has been instructed by the macro control data. The focus lens group 103 is driven to an infinity end position. Detailed operation of this EZ→macro mode change processing will be described later using FIG. 25.

If the result of determination in step S37 is not that there has been mode change from EZ to Macro, it is next determined whether or not mode change is a change from macro to electronic zoom (EZ) mode (S41). If the result of this determination is there is mode change from macro to EZ, macro→EZ mode change processing is carried out (S43). Here, refresh of the first zoom group (3G) 105 (3G initial drive) is not required, and the first and second zoom groups 105 and 105 are moved to a zoom position (Ediv) that gives the same angle of view as for macro mode. The focus lens group 103 is driven to a position furthest to the infinity side. Detailed operation of this macro→EZ mode change processing will be described later using FIG. 26.

If the result of determination in step S41 was that there was not a mode change from Macro to EZ, it is determined that mode change was a change from mechanical manual zoom (MZ) to electronic zoom (EZ) mode (S45). The refresh required flag is then set (S47). This is because it is necessary to align an absolute position from the linear encoder 177a (refer to FIG. 3) and a Pls position based on count of a number of steps of the stepping motor, while the zoom ring (zoom function switching operation member 143) is being operated manually by the user.

Once the refresh required flag has been set, next MZ→EZ mode change processing is carried out (S49). Here, position of the first zoom group (3G) 105 is detected by the linear encoder 177a of the ZM group absolute position detection section 127 (refer to FIG. 1), and the second zoom group (4G) is driven to a corresponding position based on the result of this detection. Detailed operation of this MZ→EZ mode change processing will be described later using FIG. 27.

Once the MZ→EZ mode change processing has been carried out it is next determined whether or not MZ→EZ is being driven normally (S51). Here, determination is based on whether drive is normal without loss of synchronization of the stepping motors of the first and second zoom groups 105 and 107, and whether the Pls position and the linear encoder position are normally aligned.

If the result of determination in step S51 is that MZ→EZ is being driven normally, the refresh required flag is cleared (S53). Since there has been a normal switch over from mechanical manual zoom mode to electronic zoom mode, the refresh flag is cleared.

Once the mode change processing of steps S35, S39 and S43 is completed, or if the result of determination in step S51 was that MZ→EZ was not being driven normally, or if the refresh required flag is cleared in step S53, the mode switching flow is completed, and the originating flow is returned to.

Figure 24:
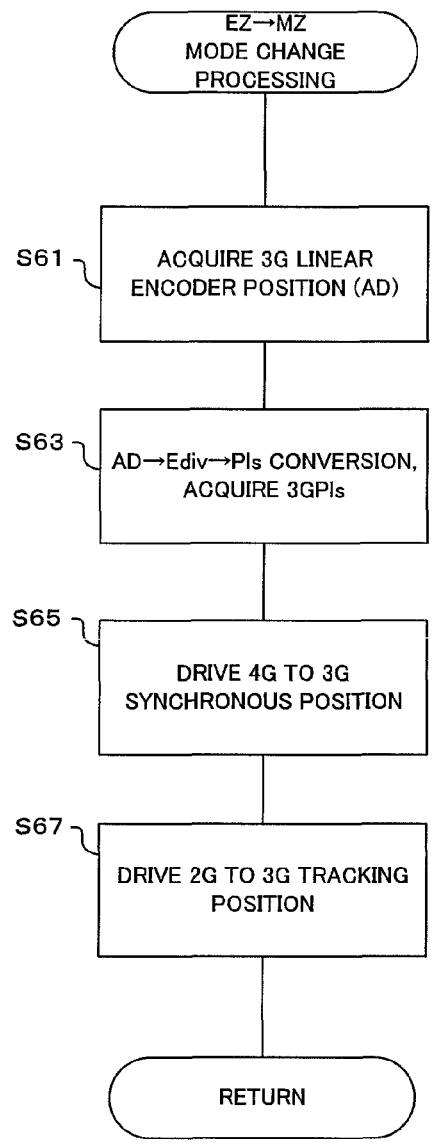
FIG. 24 is a flowchart showing operation of EZ→MZ mode update processing, in the interchangeable lens of one embodiment of the present invention.

Next, operation of the EZ→MZ mode change processing of step S35 (refer to FIG. 23) will be described using FIG. 24. If the flow for EZ→MZ mode change processing is entered, a 3G linear encoder position (AD) is acquired (S61). Here, an analog voltage corresponding to position from the linear encoder 177a is subjected to AD conversion, to acquire absolute position of the first zoom group (3G) 105.

Once the linear encoder position (AD) as been acquired, AD is converted to Ediv, and further converted to Ediv to acquire 3G Pls (S63). Here, Pls position corresponding to the absolute position of the first zoom group (3G) 105 is acquired Next, 4G (second zoom group 107) is driven to the 3G synchronous position (S65). Since absolute position of the first zoom group (3G) 105 was acquired in step S63, the synchronous pulse position table shown in FIG. 9(a) is referenced and the second zoom group (4G) 107 is driven to the synchronous position corresponding to the third zoom group (3G) 105.

Next, 2G (focus lens group 103) is driven to a 3G tracking position (S67). Here, the focus lens group 103 is driven so as to maintain a subject distance being focused on based on the focus tracking characteristic shown in FIG. 10A, in accordance with shooting distance. Ones 2G has been driven to the 3G tracking position the originating flow is returned to.

Figure 25:
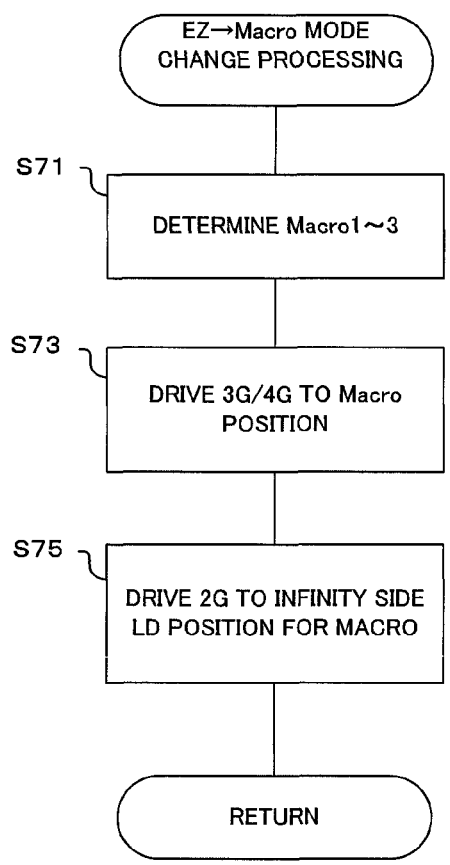
FIG. 25 is a flowchart showing operation of EZ→Macro mode update processing, in the interchangeable lens of one embodiment of the present invention.

Next, operation of the EZ→Macro mode change processing of step S39 (refer to FIG. 23) will be described using FIG. 25. If the flow for EZ→Macro mode change processing is entered, determination of Macro 1-Macro is first carried out (S71). With this embodiment, as shown in FIG. 10B, FIG. 18 etc., Macro 1-Macro 3 are provided. Two examples of switching for Macro 1-Macro 3 have been described in FIG. 18, and switching is carried out as a result of operating the function button 145 in a macro mode state, for example. In this case, determination is carried out based on operating state of the function button 145.

If determination of Macro 1-Macro 3 has been carried out, next drive of 3G/4G to a macro position is carried out (S73). Here, the first zoom group (3G) 105 and the second zoom group (4G) 107 are driven to the zoom position at the time of Macro shown in FIG. 17A.

Once 3G and 4G have been driven to the macro position, next 2G is driven to the macro infinity side lens position (LD) (S75). Here, the focus lens group 103 is driven to a focal length that is closest to the infinity side, among the shooting focal lengths shown in FIG. 10B. Since the subject distance is not known, the focus lens is driven to a far distance that gives a greater depth of field. Once 2G has been driven to a position that is closest to the infinity side in the macro shooting possible subject range (LD stroke), the originating flow is returned to.

Figure 26:
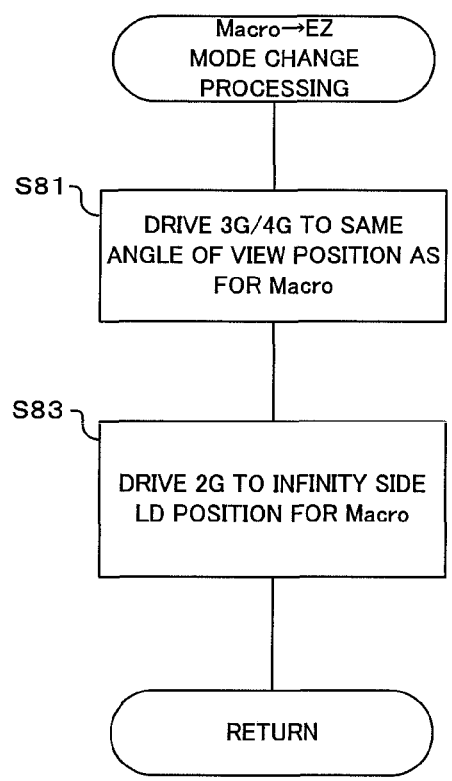
FIG. 26 is a flowchart showing operation of Macro→EZ mode update processing, in the interchangeable lens of one embodiment of the present invention.

Next, operation of the Macro→EZ mode change processing of step S43 (refer to FIG. 23) will be described using FIG. 26. If the flow for Macro→EZ mode change processing is entered, 3G/4G are first driven to a position that gives the same angle of view as Macro (FIG. 17B) (S81). Since angle of view is set for each of Macro 1-Macro 3, 3G/4G are driven to positions of the first zoom group (3G) 105 and second zoom group (4G) 107 corresponding to a zoom position in accordance with macro that has been set so as to give the same angle of view.

Once 3G and 4G have been driven so as to give the same angle of view, next 2G is driven to the macro infinity side lens position (LD) (S83). Here, the focus position of the focus lens group (2G) 103 is moved to a position of the focus lens group 103 corresponding to a subject distance that is equivalent to a position furthest to the infinity side position within the shooting range in the case of macro mode. With the example shown in table (b) of FIG. 16A, the focus lens group is driven to a shooting position of 50 cm for Macro 1, 65 cm for Macro 2, and 40 cm for Macro 3. Once 2G has been driven to the infinity side LD position, the originating flow is returned to.

In this way, by driving to positions of the first zoom group (3G) 105 and the second zoom group (4G) 107 corresponding to zoom position that is set so as to give the same angle of view as Macro 1-Macro 3, fluctuation in angle of view for a display image and a movie image is kept to a minimum. Further, by driving the focus lens group (2G) 103 to a position corresponding to a distance that is the same as a distance closest to the infinity end of the shooting range for Macro 1-Macro 3, it is possible to prevent fluctuation in focus of a display image and a movie image becoming extremely large. It is therefore made possible to prevent the user experiencing a feeling of discomfort at the time of mode change from Macro mode to EZ mode.

Figure 27:
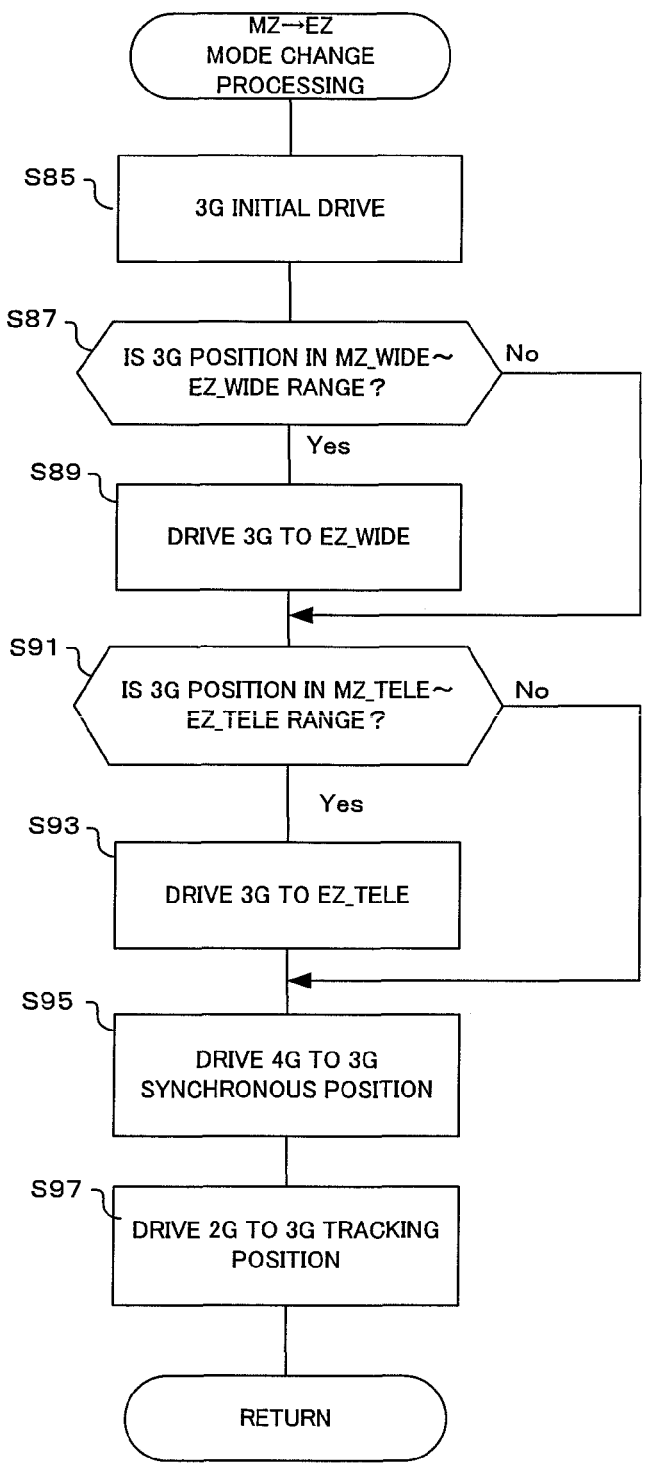
FIG. 27 is a flowchart showing operation of MZ→EZ mode update processing, in the interchangeable lens of one embodiment of the present invention.

Next, operation of the MZ→EZ mode change processing of step S49 (refer to FIG. 23) will be described using FIG. 27. If the flow for MZ→EZ mode change processing is entered, 3G initial drive is first carried out (S85). As was described previously, with mechanical manual zoom (MZ) mode, since the user operates the zoom ring (zoom function switching operation member 143) with a manual operation, there is a possibility that the absolute position of the linear encoder 177a and Pls obtained by counting the number of drive steps of the stepping motor 175a will not be in alignment. The first zoom group (3G) 105 is therefore driven to an initial position.

Next, it is determined whether or not the 3G (first zoom group 105) position is in the range of MZ_Wide to EZ_Wide (S87). Here, it is determined whether or not the zoom position of the first zoom group (3G) 105 that has been acquired from the linear encoder 177a is in the range MZ_Wide to EZ_Wide shown in FIG. 19. If the result of determination in step S87 is that the 3G position is in the range of MZ_Wide-EZ_Wide, 3G is next driven to EZ_Wide (S89).

If 3G has been driven to EZ_Wide in step S89, or if the result of decision in step S87 was that the 3G position was not in the range MZ_Wide-EZ_Wide, it is next determined whether or not 3G position is in the range MZ_Tele-EZ_Tele (S91). Here, it is determined whether or not the zoom position of the first zoom group (3G) 105 that has been acquired from the linear encoder 177a is in the range MZ_Tele to EZ_Tele shown in FIG. 19. If the result of determination in step S91 was that the 3G position is in the range MZ_Tele-EZ_Tele, 3G is next driven to EZ_Tele (S93).

Once the first zoom group (3G) 105 has been driven to EZ_Tele in step S93, or if the result of determination in step S91 was that 3G position was not in the range MZ_Tele-EZ_Tele, then next the second zoom group (4G) 107 is driven to the 3G synchronous position (S95). Since the first zoom group (3G) 105 was driven in steps S85-S93, the second zoom group (4G) 107 is next driven to a position that is synchronous with the first zoom group (3G), by referencing the synchronous pulse position table shown in FIG. 9(a).

Once the second zoom group (4G) 107 has been driven to the 3G synchronous position, the focus lens group (2G) 103 is next driven to the 3G tracking position (S97). Here, the focus lens group 103 is driven so as to maintain a subject distance being focused on based on the focus tracking characteristic shown in FIG. 10A, in accordance with shooting distance. Once 2G has been driven to the 3G tracking position the originating flow is returned to.

Figure 28:
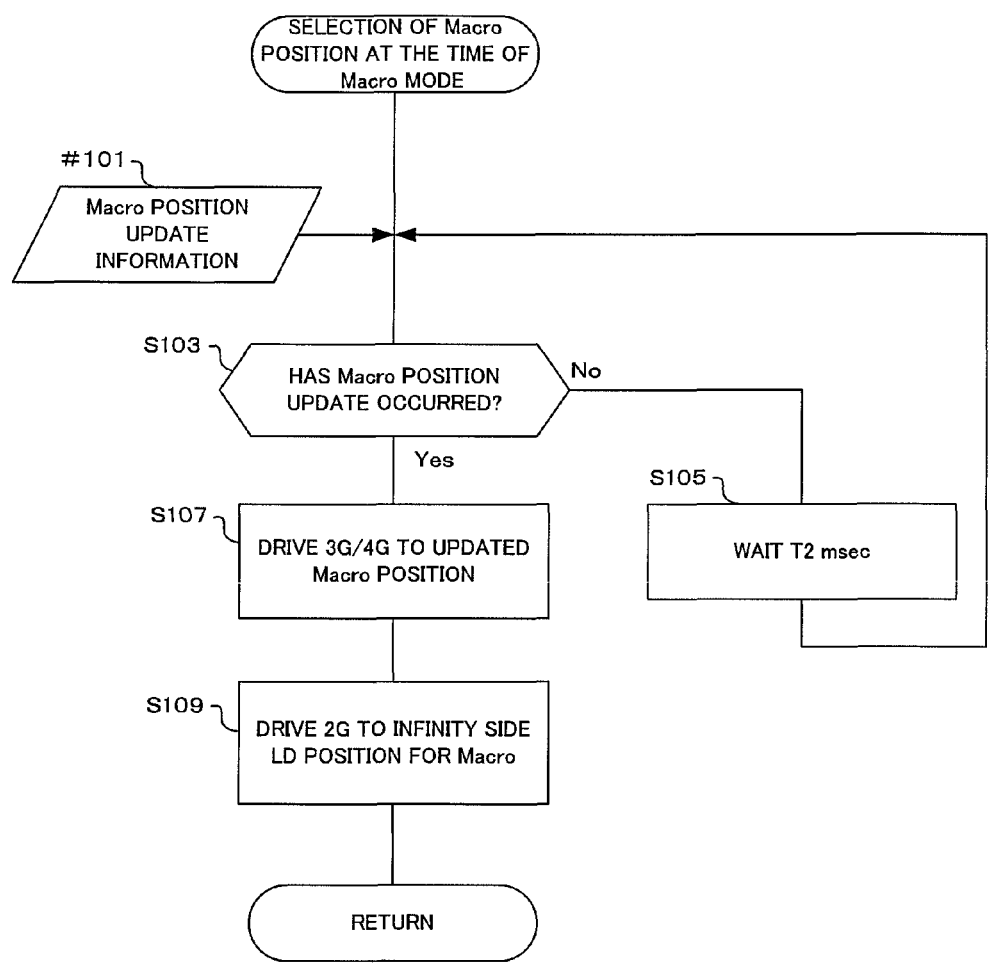
FIG. 28 is a flowchart showing operation for Macro position selection at the time of Macro mode, in the interchangeable lens of one embodiment of the present invention.

Next, in the event that selection of macro position is carried out at the time of macro mode in the main flow within the interchangeable lens 100, the flow shown in FIG. 28 is executed. In this flow, update information for macro position is first read out (#101). Here, macro position is acquired at a specified timing, and it is determined whether or not macro position has been updated.

It is next determined whether or not update to macro position has occurred (S103). Here, determination is based on the macro position update information that as read out in #101. If the result of this determination is that update to macro position has not occurred, a wait state is entered for specified time T2 msec. Once T2 msec has elapse, step S103 is returned to.

If the result of determination in step S103 is that an update to macro position who has occurred, 3G/4G are driven to the updated macro position (S107). Here, the first zoom group (3G) 105 and the second zoom group (4G) 107 are driven to the Macro position shown in FIG. 17A, in accordance with the newly set macro position.

Once 3G and 4G have been driven to the macro position, next 2G is driven to the macro infinity side LD position (S109). Here, similarly to step S83, focus position of the focus lens group (2G) 103 is moved to a position that is closest to the infinity side, within the shooting range in the case of macro mode. Once 2G has been driven to the infinity side LD position, the originating flow is returned to.

As has been described above, with the one embodiment of the present invention, first position information relating to position of the first zoom group (3G) ground position of the second zoom group (4G) corresponding to a focal length region in which zoom operation is carried out, and second position information relating to position of the first and second zoom groups having a correspondence relationship between positions of the first and second zoom group that is different from the first position information, are stored. It is therefore possible to drive the first and second zoom groups in a focal length region based on the first position information, and to drive the first and second zoom groups in a region that is different to the focus region based on the second position information. For example, as with macro shooting, drive also becomes possible outside a focal length region.

Also, with the one embodiment of the present invention, zoom operation is carried out by driving a plurality of zoom lens groups with respectively independent actuators, and it is not necessary to use a cam mechanism. It is therefore possible to achieve reduction in size as well as being able to make the mechanism quiet. In particular, noise such as sliding noise due to the cam mechanism is generated at the time of movie shooting, and it is possible to prevent lowering of movie quality that would result from this noise being recorded as part of the audio recording performed during movie shooting.

Also, with the one embodiment of the present invention, since the second position information is information for establishing an optical state for high magnification factor shooting, it is possible to provide a zoom lens unit suitable for macro shooting. The second information contains a plurality of items of information, which makes it possible to perform macro shooting at a plurality of shooting magnifications. Since is it possible to select different shooting magnification optical states, it is possible to select a shooting magnification that that is in line with the user's intentions from a plurality of macro positions.

Also, with the one embodiment of the present invention, since it is possible to set a first operating mode and a second operating mode, it becomes possible, for example, to set a zoom mode and a macro mode. In the case of changing from a first operating mode to a second operating mode, it becomes possible, for example, to change from zoom mode to macro mode since shooting magnification of the second operating mode is made high. By making angle of view the same in the case of changing from a second operating mode to a first operating mode, it is possible, for example, to give an angle of view that does not cause incongruity when changing from macro mode to zoom mode.

With the one embodiment of the present invention, both modes, namely electronic zoom and mechanical manual zoom are provided, but it is also possible to provide only one or other of these modes. Also, Macro 1-Macro 3 have been provided as macro positions, but this is not limiting, and it is also possible to provide only one macro position, or to provide a plurality of macro position, beyond 3.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. Regardless of the implementation, it is possible to adopt the present invention to any zoom lens unit that has a lens capable of varying focal length.

Also, regarding the operation flow in the patent claims, the specification and the drawings, for the sake of convenience description has been given using words representing sequence, such as "first" and "next", but this does not mean that implementation must be in this order.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An optical instrument having a first lens group and a second lens group capable of moving in an optical axis direction in order to perform optical zooming, comprising:
   a first drive section for moving the first lens group using a first actuator;

a second drive section for moving the second lens group using a second actuator that is different from the first actuator of the first drive section;

a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region with a second optical state of a higher shooting magnification than a first optical state being established when establishing substantially the same focal length as a focal length of the first optical state based on the first position information, and a control section for controlling the first drive section and the second drive section so that, when setting up an optical state of a higher shooting magnification from an optical state where positions of the first lens group and the second lens group have been positioned at positions corresponding to the same focal length that falls within a focal length region range in which zoom operations are carried out, based on the first position information, the first lens group and the second lens group are respectively moved to positions corresponding to a focal length that is mutually different to that of the first position information for within the focal length region range in which zoom operation is carried out, based on the second position information, so as to set up the second optical state.

2. The optical instrument of claim 1 further comprising:
a focus adjustment lens group, and wherein
the control section, when the second optical state of higher shooting magnification is set up based on the second position information, from an optical state based on the first position information, controls the focus adjustment lens group to a position corresponding to an infinity side distance included in a range of distance in which focus can be adjusted, in the second optical state having higher shooting magnification.

3. The optical instrument of claim 1 wherein:
the second position information includes a plurality of information items relating to position of the first lens group and position of the second lens group corresponding to a plurality of optical states having different shooting magnifications.

4. The optical instrument of claim 3 further comprising:
a selection section for selecting a specific optical state from the plurality of optical states having different shooting magnifications, and wherein
the control section, in accordance with optical state selected by the selection section controls the first lens drive section and the second lens drive section based on second position information, and control position of the first lens group and position of the second lens group in accordance with the selected optical state.

5. An optical instrument having a first lens group and a second lens group capable of moving in an optical axis direction in order to perform optical zooming, comprising:
a first drive section for moving the first lens group using a first actuator;
a second drive section for moving the second lens group using a second actuator that is different from the first actuator of the first drive section;

a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region, and that establishes a second optical state where focus adjustment is possible at a shorter distance than a distance for which focus adjustment is possible in the first optical state, being substantially identical to focal length of the first optical state that is established by positioning the first lens group and the second lens group at a first lens group position and a second lens group position that fall within the first position information, and a control section for controlling the first drive section and the second drive section so that, when setting up an optical state where focus adjustment is possible at a closer distance, based on the second position information, from an optical state where the first lens group and the second lens group have been positioned at positions corresponding to the same focal length that falls within a focal length region range in which zoom operation is carried out, based on the first position information, the first lens group and the second lens group are respectively moved to positions corresponding to focal lengths that are mutually different to those of the first position information, based on the second position information, so as to set up the second optical state.

6. The optical instrument of claim 5, wherein:
a focus adjustment lens group, and wherein
the control section, when a second optical state in which focus adjustment is possible to a closer distance is established based on the second position information, from an optical state based on the first position information, controls the focus adjustment lens group to a position corresponding to an infinity side of distance included in a range in which focus adjustment is possible, in the second optical state where focus adjustment to the closer distance is possible.

7. The optical instrument of claim 5, wherein:
the second position information includes a plurality of information items relating to position of the first lens group and position of the second lens group corresponding to a plurality of optical states having different shooting magnifications.

8. The optical instrument of claim 7 further comprising:
a selection section for selecting a specific optical state from the plurality of optical states having different shooting magnifications, and wherein
the control section, in accordance with optical state selected by the selection section, controls the first lens drive section and the second lens drive section based on second position information, and control position of the first lens group and position of the second lens group in accordance with the selected optical state.

9. An optical instrument having a first lens group and a second lens group capable of moving in an optical axis direction in order to perform optical zooming, comprising:
a first drive section for moving the first lens group using a first actuator;
a second drive section for moving the second lens group using a second actuator that is different from the first actuator of the first drive section;

a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to respectively different focal lengths that fall within the focal length region, and that establishes a second optical state of higher shooting magnification than a first optical state, being substantially identical to focal length of the first optical state that is established by positioning the first lens group and the second lens group at a first lens group position and a second lens group position that fall within the first position information, and a control section for controlling the first drive section and the second drive section so as to move the first lens group and the second lens group to positions corresponding to a first optical state where the same angle of view is achieved as for a second optical state having a large shooting magnification based on the first position information, when establishing an optical state based on the first position information from the second optical state where shooting magnification is higher based on the second position information.

10. The optical instrument of claim 9 further comprising:
a focus adjustment lens group, and wherein
the control section, when a first optical state has been established based on the first position information, from a second optical state having higher shooting magnification based on the second position information, controls the focus adjustment lens group to an infinity side of distance included in a range of distance for which focus adjustment is possible in the second optical state.

11. An optical instrument having a first lens group and a second lens group capable of moving in an optical axis direction in order to perform optical zooming, comprising:
a first drive section for moving the first lens group using a first actuator;
a second drive section for moving the second lens group using a second actuator that is different from the first actuator of the first drive section;
a storage section for storing first position information relating to positions of the first lens group and positions of the second lens group corresponding to identical focal lengths that fall within a focal length region range in which zoom operations of the optical instrument are carried out, and second position information relating to positions of the first lens group and positions of the second lens group corresponding to different focal lengths that fall within the focal length region, and that establishes a second optical state where focus adjustment is possible at a shorter distance than a distance for which focus adjustment is possible in the first optical state, being substantially identical to focal length of the first optical state that is established by positioning the first lens group and the second lens group at a first lens group position and a second lens group position that fall within the first position information, and a control section for controlling the first drive section and the second drive section so as to move the first lens group and the second lens group to positions corresponding to the first optical state where the same angle of view is achieved as for the second optical state, where the focus adjustment is possible at a closer distance, based on the first position information, when establishing an optical state based on the first position information from the second optical state where focal length adjustment is possible at a closer distance based on the second position information.

12. The optical instrument of claim 11 further comprising:
a focus adjustment lens group, and wherein
the control section, when a first optical state has been established based on the first position information, from a second optical state capable of focusing to a closer distance based on the second position information, controls the focus adjustment lens group to an infinity side of distance included in a range of distance for which focus adjustment is possible in the second optical state.

* * * * *